(12) United States Patent
Jolic

(10) Patent No.: US 12,704,744 B2
(45) Date of Patent: Aug. 11, 2026

(54) MICRO-OPTIC DEVICE

(71) Applicant: CCL Secure Pty Ltd, Craigieburn (AU)

(72) Inventor: Karlo Jolic, Craigieburn (AU)

(73) Assignee: CCL Secure Pty Ltd, Craigieburn (AU)

( * ) Notice: Subject to any disclaimer, the term of this patent is extended or adjusted under 35 U.S.C. 154(b) by 755 days.

(21) Appl. No.: 17/840,330

(22) Filed: Jun. 14, 2022

(65) Prior Publication Data

US 2022/0326540 A1 Oct. 13, 2022

Related U.S. Application Data

(63) Continuation of application No. PCT/AU2020/051395, filed on Dec. 18, 2020.

(30) Foreign Application Priority Data

Dec. 19, 2019 (AU) ................................ 2019904819

(51) Int. Cl.

| | |
|---|---|
| ***B42D 25/342*** | (2014.01) |
| ***B29D 11/00*** | (2006.01) |
| ***B42D 25/425*** | (2014.01) |
| ***G02B 3/00*** | (2006.01) |
| ***G02B 27/06*** | (2006.01) |
| ***G02B 30/10*** | (2020.01) |
| ***G02B 30/27*** | (2020.01) |
| *B42D 25/351* | (2014.01) |

(52) U.S. Cl.
CPC ........ *G02B 30/10* (2020.01); *B29D 11/00307* (2013.01); *B42D 25/342* (2014.10); *B42D 25/425* (2014.10); *G02B 3/0043* (2013.01); *G02B 3/005* (2013.01); *G02B 27/06* (2013.01); *G02B 30/27* (2020.01); *B42D 25/351* (2014.10); *G02B 2003/0093* (2013.01)

(58) Field of Classification Search
CPC ...... B42D 25/342; B42D 25/29; B42D 25/30; G02B 3/005; G02B 27/06; G02B 30/27; B29D 11/00326
USPC ........................................ 359/2, 619; 283/72
See application file for complete search history.

(56) References Cited

U.S. PATENT DOCUMENTS

2011/0019283 A1* 1/2011 Steenblik ............. G02B 3/0031 359/627
2013/0044362 A1* 2/2013 Commander ........ B42D 25/355 359/291
2014/0367957 A1 12/2014 Jordan
(Continued)

FOREIGN PATENT DOCUMENTS

CN 105313529 A 2/2016

OTHER PUBLICATIONS

International Preliminary Report on Patentability, Chapter II, Patent Cooperation Treaty Application No. PCT/AU2020/051395, Mar. 29, 2022, 8 pages.
(Continued)

*Primary Examiner* — Audrey Y Chang
(74) *Attorney, Agent, or Firm* — Mintz, Levin, Cohn, Ferris, Glovsky and Popeo, P.C.; Daniel Brownstone

(57) ABSTRACT

The present invention relates to a micro-optic device for use in a micro-optic image presentation system. Specifically, the micro-optic device is formed as a single layer unitary structure arranged to generate various complex imagery effects.

20 Claims, 19 Drawing Sheets

(56) References Cited

U.S. PATENT DOCUMENTS

| | | | | |
|---|---|---|---|---|
| 2017/0165997 | A1* | 6/2017 | Holmes ................ | B42D 25/373 |
| 2017/0336644 | A1 | 11/2017 | Lundvall et al. | |
| 2018/0117948 | A1 | 5/2018 | Power | |
| 2018/0186165 | A1* | 7/2018 | Holmes ............ | B29D 11/00442 |
| 2019/0092082 | A1 | 3/2019 | Jolic | |

OTHER PUBLICATIONS

International Search Report and Written Opinion, Patent Cooperation Treaty Application No. PCT/AU2020/051395, Jan. 28, 2021, 19 pages.

* cited by examiner

Reflective overcoat located between opaque substrate and unitary structure

Reflective overcoat located between unitarysubstrate and observer

MICRO-OPTIC DEVICE

CROSS-REFERENCE TO RELATED APPLICATIONS

This application is a bypass continuation application of International PCT Application No. PCT/AU2020/051395, filed on Dec. 18, 2020, which claims priority to Australian patent application No. 2019904819, filed on Dec. 19, 2019, which are incorporated by reference herein in their entirety.

TECHNICAL FIELD

The present invention relates to a micro-optic device for use in a micro-optic image presentation system. Embodiments of the invention can be used as a security device for a security document, such as bank notes and coins, credit cards, cheques, passports, identity cards, and the like, and it will be convenient to describe the invention in relation to that exemplary, non-limiting application.

BACKGROUND OF INVENTION

It is well known that many of the world's bank notes as well as other security documents bear security devices which produce optical effects enabling a visual authentication of the bank note. Some of these security devices include focusing elements, such as micro lenses or micro mirrors, which act to sample and magnify image elements and project imagery which is observable from a first viewing angle by a user.

In conventional micro-optical security features in polymer bank notes, the micro lenses and image elements with which the micro lenses interact to project imagery to a user are typically applied to opposite sides of the polymer substrate. In other words, the polymer substrate itself forms part of each micro optic device, acting as an optical spacer, focusing light through the thickness of the bank note from the micro imagery layer to the eye.

Whilst this has certain advantages compared to providing lenses in threads, in that larger lenses can be used thereby enabling more complex images and effects to be produced, the disadvantage of such a configuration is that the feature occupies an area on both sides of the polymer bank note and yet enables imagery to be projected from one side of the polymer bank note only. That is, the micro-optical effects are typically only able to be viewed from one side of the banknote, namely the side with the lenses even though they occupy space on both sides of the substrate.

Furthermore, the area occupied by the image elements typically cannot be overprinted with typical bank note design artwork because to do so would compromise the appearance of the optical effects, viewable from the lens side only. In other words, the overprinted art work can be visible from the lens side particularly if the overprinting colour used is dark. This phenomenon is known as "show-through" and can severely limit which designs are possible to use in such "dead" areas of the banknote, where the image elements of the lens security feature are located.

Furthermore, the manufacture of such devices generally requires significant capital equipment investment, expensive tooling, and produces high spoilage.

It would be desirable to provide a micro-optic device notably for a security document which better utilises space available for security/authentication purposes and/or enables the micro-optic device to be more reasonably integrated into the security document from a design perspective.

Alternatively or additionally, it would also be desirable to provide a micro-optic device for a security document that enables optical effects to be generated which are viewable from both sides of the security document for security/authentication purposes.

Alternatively or additionally, it would also be desirable to provide a solution for implementing interlaced imagery designs in a unitary micro-optic device, in which both the optical elements and the imagery elements are located on a common side of a security document as a unitary single layer structure.

Alternatively or additionally, it would also be desirable to provide a micro-optic device which is capable of being configured to generate a broad range of dynamic optical effects which make the security feature difficult to counterfeit.

Alternatively or additionally, it would also be desirable to provide a micro-optic device that ameliorates or overcomes one or more disadvantages or inconveniences of known micro-optic devices, or to at least provide an alternative choice for the general public.

The present disclosure provides a number of such improved micro-optic devices. It also provides new methods of manufacturing such micro-optic devices, and new methods of manufacturing tools that can be used to produce such micro-optic devices.

Any reference to or discussion of any document, act or item of knowledge in this specification is included solely for the purpose of providing a context for the present invention. It is not suggested or represented that any of these matters or any combination thereof formed at the priority date part of the common general knowledge, or was known to be relevant to an attempt to solve any problem with which this specification is concerned.

SUMMARY OF INVENTION

In a first aspect, the present disclosure provides a micro-optic device including:

a substrate including a first surface and a second surface;

optical elements; and image elements, wherein the optical elements and the image elements are integrally formed as a unitary structure located on the first or the second surface of the substrate, and wherein the image elements are arranged to be sampled by the optical elements to produce a first optical effect observable from the first surface of the substrate, and a second optical effect observable from the second surface of the substrate.

In one embodiment, the first and second optical effects are observable in both transmission and reflection.

In one embodiment, the first and second optical effects are observed more easily in reflection than in transmission.

In one embodiment, both the first optical effect and the second optical effect are optically variable effects.

In one embodiment, the first optical effect and the second optical effect are different optical variable effects.

In one embodiment, both the first and the second optical effects are moire magnification effects or integral image effects.

In one embodiment, wherein a perceived depth effect of the moire magnification effects or integral image effects is inverted when the micro-optic device is viewed from an opposite side of the substrate.

In one embodiment, a perceived depth effect of the moire magnification effects is inverted when the micro-optic device is viewed in reflection, but not in transmission.

In one embodiment, wherein the image elements are associated with a plurality of interlaced images, or moire images, or integral images.

In one embodiment, the image elements are associated with interlaced images which represent an animation, such that micro-optic device displays an animation effect when the device is viewed at successive angles.

In one embodiment, the image elements are associated with interlaced images which represent a 3-dimensional (3D) appearance of an object or a scene, such that the micro-optic device produces a 3D effect.

In one embodiment, the image elements are formed as fixed size image pixels, for example, the image pixels are of a square or a rectangular shape of approximately 10 microns and are recessed into or protruding from the surface of the optical elements.

In one embodiment, the image elements are associated with two interlaced images and the micro-optic device produces an image flipping effect of the interlaced images.

In one embodiment, each image element includes an array of dots, and the image elements that represent the first interlaced image are substantially located on a left side of their corresponding optical elements, and the image elements that represent a second image are substantially located on a right side of their corresponding optical elements.

In one embodiment, the optical elements include a one-dimensional array of part cylindrical lenses, and the image elements include phase displaced image elements, wherein the offset distance is a function of an input greyscale value derived from an input greyscale image.

In one embodiment, the optical elements include part concave and part convex lenses.

In one embodiment, the image elements are entirely formed in surfaces of the optical elements; or partially formed in surfaces of the optical elements, and partially located in spaces between adjacent optical elements; or some of the image elements may be formed in surfaces of the optical elements, and some may be located in spaces between adjacent optical elements.

In one embodiment, the image elements are formed such that they occupy not more than 50% of the surface area of the optical elements.

In one embodiment, the image elements are either recessed into surfaces of the optical elements or spaces between adjacent optical elements, or formed as protrusions which protrude from the surfaces of the optical elements or the spaces between adjacent optical elements, wherein the image elements protruding or recessed distance is less than the maximum depth or maximum height of the optical elements.

In one embodiment, the protruding or recessed distance is less than 7 microns, more preferably it is up to 5 microns, or less than 2 microns.

In one embodiment, a reflective layer is provided to enhance visibility of the optical effect(s), the reflective layer being provided between the substrate and the micro-optic device, or between the micro-optic device and an observer, as a thin translucent coating over the optical elements and the image elements.

In a second aspect, the present disclosure provides a micro-optic device, comprising:

a substrate, including a first surface and a second surface;

optical elements; and image elements, wherein the image elements are associated with a plurality of interlaced images, and the image elements are arranged to be sampled by the optical elements to produce an optical effect, wherein the optical elements and the image elements are integrally formed as a unitary structure located on the first or the second surface of the substrate.

In a third aspect, the present disclosure provides a micro-optic device including:

a substrate including a first surface and a second surface;

optical elements, wherein at least some of the optical elements include a part concave and a part convex surface profile; and image elements, wherein the image elements are arranged to be sampled by the optical elements to produce an optical effect, and the optical elements and the image elements are integrally formed as a unitary structure located on the first or the second surface of the substrate.

In a fourth aspect, the present disclosure provides a micro-optic device including:

a substrate including a first surface and a second surface;

optical elements; and image elements, wherein the image elements are arranged to be sampled by the optical elements to produce an optical effect, wherein the optical elements and the image elements are integrally formed as a unitary structure located on the first or the second surface of the substrate, and at least some of the image elements are at least partially located in spaces between adjacent optical elements.

Definitions

Security Document or Token

As used herein, the terms security documents and tokens includes all types of documents and tokens of value and identification documents including, but not limited to the following: items of currency such as bank notes and coins, credit cards, cheques, passports, identity cards, securities and share certificates, driver's licences, deeds of title, travel documents such as airline and train tickets, entrance cards and tickets, birth, death and marriage certificates, and academic transcripts.

The invention is particularly, but not exclusively, applicable to security devices, for authenticating items, documents or tokens, such as bank notes, or identification documents, such as identity cards or passports, formed from a substrate to which one or more layers of printing are applied.

More broadly, the invention is applicable to a micro-optic device which, in various embodiments, is suitable for visual enhancement of clothing, skin products, documents, printed matter, manufactured goods, merchandising systems, packaging, point of purchase displays, publications, advertising devices, sporting goods, security documents and tokens, financial documents and transaction cards, and other goods.

Security Device or Feature

As used herein, the term security device or feature includes any one of a large number of security devices, elements or features intending to protect security document or token from counterfeiting, copying, alteration or tampering. Security devices or features may be provided in or on the substrate of the security document or in or on one or more layers applied to the base substrate, and may take a wide variety of forms such as security threads embedded in layers of the security document; security inks such as fluorescent, luminescent or phosphorescent inks, metallic inks, iridescent inks, photochromic, thermochromic, hydrochromic, or peizochromic inks; printed or embossed features including release structures; interference layers; liquid crystal devices; lenses and lenticular structures; optically variable devices (OVDs) such as diffractive devices including diffraction gradients, holograms and diffractive optical elements (DOEs).

Substrate

As used herein, the term substrate refers to the base material from which the security document or token is formed. The base material may be paper or other fibrous materials such as cellulous; a plastic or polymeric material including but not limited to polypropylene (PP), polyethylene (PE), polycarbonate (PC), polyvinyl chloride (PVC), polyethylene terephthalate (PET), biaxially-oriented polypropylene (BOPP); or a composite material of two or more materials, such as a laminate of paper and at least one plastic material, or of two or more polymeric materials.

Transparent Windows and Half Windows

As used herein, the term window refers to a transparent or translucent area in the security document compared to the opaque region to which printing is applied. The window may be fully transparent so as to allow the transmission of light substantially unaffected, or it may be partly transparent or translucent, partly allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting at least one opacifying layer in the region forming the window area. If opacifying layers are applied to both sides of a transparent substrate, a fully transparent window may be formed by omitting the opacifying layers on both sides of the transparent substrate in the window area.

A partly transparent or translucent area herein after referred to as a "half-window", may be formed in a polymeric security document which has opacifying layers on both sides by omitting the opacifying layers on one side only of the security document in the window area so that "half-window" is not fully transparent but allows sunlight to pass through without allowing objects to be viewed clearly through the half-window.

Alternatively, it is possible for the substrates to be formed from a substantially opaque material, such as paper or fibrous material, without an insert of transparent plastics material inserted into a cut out or recessed into the paper or fibrous substrate to form a transparent window or a translucent half-window area.

Opacifying Layers

One or more opacifying layers may be applied to a transparent substrate to increase the opacity of the security document. An opacifying layer is such that $L_T<L_0$ where $L_0$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Optical Elements

One or more optical elements may be applied to the substrate of the security device. As used herein, the term "optical element" refers to elements and devices that focus light towards or cause light to constructively interfere at a real focal point, or devices placed in front of an image source to selectively reveal different portions of the image source. Optical elements include refractive elements that focus incoming light to a real focal point in a real focal plane and also collimate light scattered from any point in the focal plane to a particular direction. Optical elements also include transmissive diffractive lenses, zone plates and the like that cause transmitted diffracted light to constructively interfere at a desired real focal point.

Optical elements also include a sampling screen or parallax barrier to show a stereoscopic image or multiscopic image to a user. When placed on one side of a transparent substrate, a sampling screen or parallax barrier consists of a layer of material with a series of precision slits, allowing each eye to see a different section of the image elements on the other side of the substrate, so creating a sense of depth through parallax in an effect similar to that created by lenticular lenses.

BRIEF DESCRIPTION OF DRAWINGS

Preferred embodiments of the invention will now be described by way of example only with reference to the accompanying drawings in which.

DETAILED DESCRIPTION OF DRAWINGS

Figure 1:
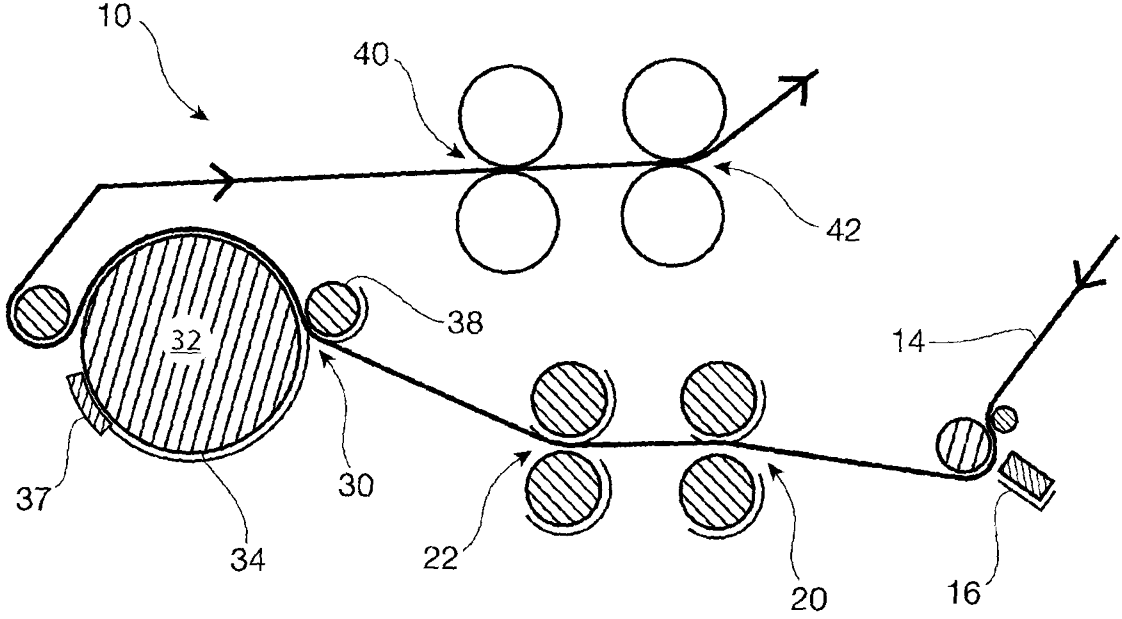
FIG. 1 is a schematic diagram of one embodiment of an apparatus for in-line manufacturing of a security document.
Figure 2:
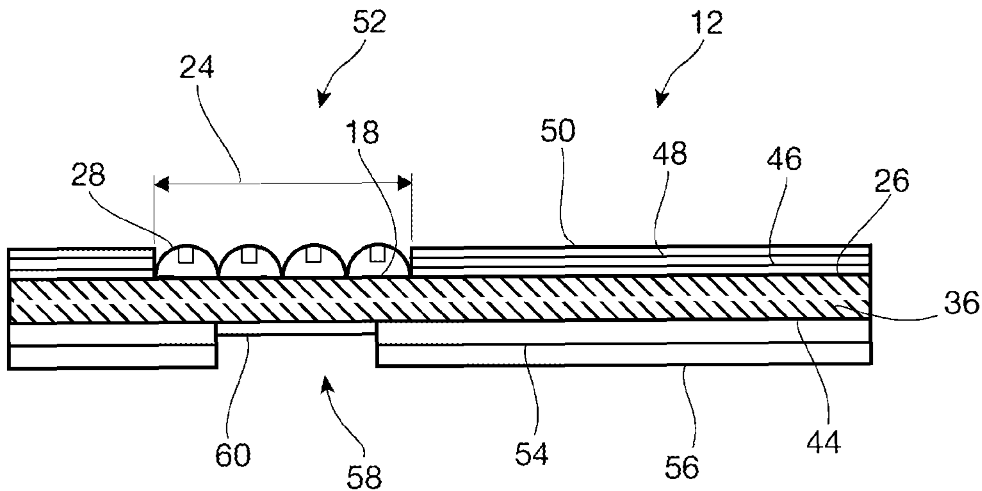
FIG. 2 is a cutaway side view of the partially manufactured security document manufactured by the apparatus of FIG. 1.

FIG. 1 shows an apparatus 10 for in-line manufacturing part of an exemplary document 12 depicted in FIG. 2, which includes a micro-optic device 28 of the present disclosure. The document 12 is a security document such as a banknote substrate.

A continuous web 14 of material such as polypropylene or PET and which may be transparent, translucent or opaque, forms a substrate and is subject to an adhesion promoting process at a first processing station 16 including a roller assembly. Suitable adhesion promoting processes are flame treatment, corona discharge treatment, plasma treatment or similar.

An adhesion promoting layer 18 is applied at a second processing station 20 including a roller assembly. A suitable adhesion promoting layer is one specifically adapted for the promotion of an adhesion of embossable coatings, such as UV-curable coatings to polymeric surfaces. The adhesion promoting layer may have a UV curing layer, a solvent-based layer, a water-based layer or any combination of these.

At a third processing station 22 which also includes a roller assembly, an embossable coating, such as a radiation curable coating is applied to the surface of the adhesion promoting layer 18. The embossable coating can be applied via flexographic printing, gravure printing or a silk screen printing process and variations thereof amongst other printing processes.

The embossable coating is only applied to an area 24 on a first surface 26 where the micro-optic device 28 is to be positioned. The micro-optic device 28 includes optical elements, and corresponding image elements which are integrally formed with the optical elements such that both the optical elements and the image elements are located on the same side of the substrate 36, rather than being provided on opposite surfaces. The image elements are arranged to be sampled by the optical elements in order to generate one or more images. The area 24 can take the form of a stripe, a discrete patch in the form of simple geometric shape or in the form of a more complex graphical design.

While the embossable coating is still, at least partially, liquid, it is processed to form the micro-optic device 28 at a fourth processing station 30. In one embodiment, the processing station 30 includes an embossing roller 32 for embossing microstructures representative of the optical elements and the image elements of the micro-optic device 28 into the embossable coating. The cylindrical embossing surface 34 has surface relief formations corresponding to the shape of the microstructures to be formed. In one embodiment, the surface relief formations can orient the optical elements and the image elements in the machine direction, transverse to the machine direction, or in multiple directions at an angle to the machine direction. The apparatus 10 can form optical elements and image elements in a variety of shapes.

The cylindrical embossing surface 34 of the embossing roller 32 may have a repeating pattern of surface relief formations or the relief structure formations may be localized to individual shapes corresponding to the shape of the area 24 on the substrate 36.

The embossing roller 32 may have the surface relief formations formed by suitable means, such as mechanical engraving as by a diamond stylus of appropriate cross section, or by direct laser engraving, or by chemical etching, or the surface relief formations may be provided by at least one embossing shim 37 provided on the embossing roller 32. The at least one embossing shim may be attached via adhesive tape, magnetic tape, clamps or other appropriate mounting techniques.

A number of different techniques for manufacturing such an embossing shim are described below:

Laser Micro-Machining Approach/Laser Lithography

Excimer laser micro-machining has been used in the past to machine 3-D microstructures including masters for mould tooling (see for example: Jolic K I, Ghantasala M K and Harvey E C, "Excimer laser machining of corner cube structures", Journal of Micromechanics and Microengineering, Vol. 14, no. 3 (2004), pp. 388-397).

Excimer lasers have also been used in the past to make refractive micro-lens arrays (an example of a company who do this are Optec s.a., ZAE Le Crachet, Avenue des Nouvelles Technologies, 53, B-7080 Frameries Belgium).

Laser micro-machining techniques based on mask projection (i.e. laser ablation) could therefore be used to laser machine integrated refractive micro-lenses and micro-imagery, into a material such as polycarbonate, to form a master mould. The micro-imagery elements could be machined as recessed areas in the master mould. They could also be machined as micro-structured surface texture. The master mould could then be electroplated, to form an embossing metal shim.

Alternatively, the micro-lenses (concave or convex or diffractive) could be pre-fabricated (using established methods—for example hot-embossing) in a material such as polycarbonate. Laser micro-machining techniques based on mask projection could then be used to laser machine the micro-imagery directly into the lenses (the micro-imagery elements could be machined as recessed areas that are flat; they could also be machined as micro-structured surface texture) to complete the integrated master mould. The master mould could then be electroplated to form an embossing metal shim.

Alternatively, laser micro-machining techniques using mask projection could be used to make the imagery component of the integrated structure as follows: (i) coat the lens metal master (concave or convex or diffractive; previously fabricated using established techniques e.g. electroforming from lens master mould) with a layer of laser machine-able dry film resist; (ii) use laser to micro-machine 2-D imagery pattern in the dry film resist to expose underlying lens metal layer (i.e. remove dry film resist completely in areas corresponding to imagery pattern); and (iii) chemically etch the exposed metal areas to make these areas recessed &/or textured—or alternatively electroplate the exposed areas to make these areas extend above the neighbouring lens surface.

UV Lithography Technique

UV lithography techniques may also be used to fabricate master moulds of integrated micro-lenses and micro imagery structures. This could be achieved as follows: (i) coat the lens metal master (concave or convex or diffractive—previously fabricated using established techniques e.g. electroforming from lens master mould) with a (preferably planar) layer of photo-resist; (ii) use mask aligner to UV-expose the 2-D imagery pattern in the photoresist; (iii) chemically develop the UV-exposed photoresist layer so as to expose the underlying metal layer of the lens master in the areas of the 2-D imagery pattern; (iv) chemically etch the exposed metal areas to make these areas recessed &/or textured—or alternatively electroplate the exposed areas to make these areas extend above the neighbouring lens surface.

Direct Laser Writing

Direct laser writing methods (mask-less laser lithography, grey tone lithography) could also be used to manufacture integrated micro lens and micro imagery structures, including lens structures that are refractive or diffractive, and imagery structures that are diffractive. These methods involve X-Y raster scanning a laser beam that is focused on the photoresist surface. The dosage of the laser beam is spatially varied in X and Y, in accordance with the desired structure depth at each point. The photoresist is then developed to produce the 3-D surface. An example machine with this technology is the DWL 425 (Heidelberg Instruments, Germany).

Alternatively, the present disclosure provides an improved method of creating an embossing roller by directly forming surface relief formations in the surface of an embossing roller, thereby completely eliminating the need of preparing an embossing shim and then attaching to the embossing roller. This method will be explained in more detail later.

The embossable coating on the substrate is brought into intimate contact with the cylindrical embossing surface 34 of the embossing roller 32 by a UV roller 38 at processing station 30 such that the embossable coating flows into the surface relief formations of the cylindrical embossing surface 34. At this stage, the embossable coating is exposed to UV radiation, for example, by transmission through the substrate layer 36 (web 14).

With the micro-optic device 28 applied to the document substrate 36, one or more additional layers are applied at a downstream processing station including further roller assemblies 40 and 42. The additional layers may be clear or pigmented coatings and applied as partial coating, as a contiguous coating or accommodation of both. In one preferred method, the additional layers are opacifying layers which are applied to one or both surfaces of the substrate 36 except in the region of the security element structure.

FIG. 2 shows a partially manufactured security document 12 formed with an micro-optic device 28 in the form of a unitary structure having an array of optical elements and their corresponding image elements. The security document 12 comprises a transparent substrate of polymeric material, preferably an axially orientated polypropylene (BOPP) having a first surface 26 and a second surface 44. Opacifying layers 46, 48 and 50 are applied to the first surface 26, except a window area 52 where the security element structure 28 is applied to the first surface 26.

Opacifying layers 54 and 56 are applied to the second surface 44 except in a window area 58. The window area 58 substantially coincides with the window area 52 on the first surface 26. A printed layer 60 may be applied to the second surface 44 on the opposite side of the substrate in the window area 58. As an alternative to the embodiment of FIG. 2, the micro-optic device 28 may be provided on an opaque substrate, which may remove the need for the opacifying layers of FIG. 2. Indicia print layers can then simply be provided in areas in which the micro-optic device 28 is not present and, if desired, the print layers may even overlap the micro-optic device 28. A reflective layer may be provided to enhance visibility of the optical effect(s), the reflective layer being provided between the substrate 36 and the micro-optic device 28, or between the micro-optic device 28 and an observer, for example as a thin translucent coating over the optical elements and the image elements.

As mentioned above, the present disclosure includes an improved method of producing a solid embossing roller for creating the micro-optic device 28. The solid embossing roller can be produced as follows.

The first step is to create image element forming structures in the embossing roller. Each roller may contain a plurality of separate image element forming structures. For example, a web, as shown in FIG. 1, may be able to accommodate more than one document across its width and, therefore, a separate image element forming structure is provided for each document. In addition, the roller may also have separate image element forming structures circumferentially as well. A roller, generally of a solid cylindrical shape, is evenly and thinly coated with a layer of resist material. The resist coated roller is then exposed to a patterned laser radiation, such that only the areas that correspond to the image elements are exposed to the laser. Then, a developer solution washes out the resist in the laser exposed areas, leaving residue resist in areas that have not been exposed to the patterned laser radiation. Next, the roller is immersed in a chemical etchant. As some areas of the roller is covered in resist and some areas of the roller is now exposed, the exposed areas react with the chemical etchant, to allow image element forming structures to be etched into the surface of the roller by a predetermined depth, such as by 5 microns. After the etching step, the remaining first layer of resist is washed off from the roller, which now bears a surface relief associated with the image element forming structures.

Next, the roller is coated with a second layer of resist material, such that the already etched areas (image element forming structures) are again over-coated with the resist material. The roller is then exposed to a second patterned laser, different from the first patterned laser, such that only the areas that correspond to the optical elements are exposed to the laser. The resist in the laser exposed area is then washed again in a developer solution, after which, the entire roller is immersed in the chemical etchant to etch the optical element areas to a greater depth. The second etching step also etches the aforementioned (already etched) image element forming structures by a further 10 microns, so that the maximum depth of the micro-optic device is 15 microns.

After the second etching step, the remaining second resist material is washed off and the roller is optionally flash chrome plated to improve its durability.

In the example described above, the embossing roller is laser exposed, washed, and etched twice so as to separately create image element forming structures and then optical element forming structures in the surface of the embossing roller. The embossing roller is then ready to be used to create micro-optic devices of the present disclosure. It should be appreciated that this process may be reversed, in the sense that the optical element forming structures can be formed in the embossing roller first, and then the image element forming structures are created after. However, it was observed that etching a shallower structure first (for example, image element forming structures) has its advantages. This method allows the second layer of resist material to cover the recessed image element forming structures produced from the first etching step more easily. This full coverage by the second resist material enables the second etching step to be completed more correctly and successfully.

An alternative method to the one described above can also be used to create desired surface relief in the embossing roller. Rather than laser exposing and then chemically developing, a laser ablation technique is used to remove the resist from required areas, thereby creating the etching mask layer. The embossing roller is then subject to the etching step as usual. Comparing to the procedure described above, this method omits the chemical developing step.

Another alternative method that can be used to create desired surface relief replaces the chemical etching step with a laser engraving technique. Rather than using chemical etching to create the structures in the embossing roller, a direct laser engraving technique is used to engrave into the copper of the roller, to thereby create the required unitary structure geometry. The optical elements and the image elements can be engraved at the same time (in one laser engraving step) or separately (in two laser engraving steps—one for the optical elements and one for the image elements) with optional electro-polishing (reverse electroplating) in order to reduce the surface roughness of the laser engraved geometry.

It will be appreciated that the embossing roller used to create the micro-optic device will include a surface relief which is complementary to the microstructures of the optical elements and the image elements. For example if the optical elements of the micro-optic device are concave cylindrical lenses and the image elements are recessed into the surface of the concave cylindrical lenses, then the surface relief of the embossing roller will include a complementary convex cylindrical lens structure and protrusions extending from the surface of the convex cylindrical lens structure.

The embossing roller typically has an array of such surface relief structures corresponding to the micro-optic devices to be formed, and the surface relief structures are evenly distributed such that as it is brought into contact with the moving web carrying the embossable coating, it embosses a repeating array of optical elements and image elements into the coating in a single embossing action. The moving web then becomes the substrate of the micro-optic devices. Typically, the embossing roller can form part of an inline manufacturing process which is used to manufacture security documents including micro-optic devices of the present disclosure. After the inline manufacturing process, the moving web carrying the micro-optic devices is divided into individual sheets and eventually individual security document such as banknotes.

Various embodiments of the micro-optic device 28 will be described next with reference to the figures.

Unitary Structure Providing Interlaced Imagery Effects

In one embodiment, the image elements of the micro-optic device are associated with interlaced images. Such micro-optic device can be configured to provide a broad range of dynamic optically variable effects which will be explained below with reference to FIGS. 3, 4, 5, 6, 7*a-b*, 8, and 9.

Figure 3:
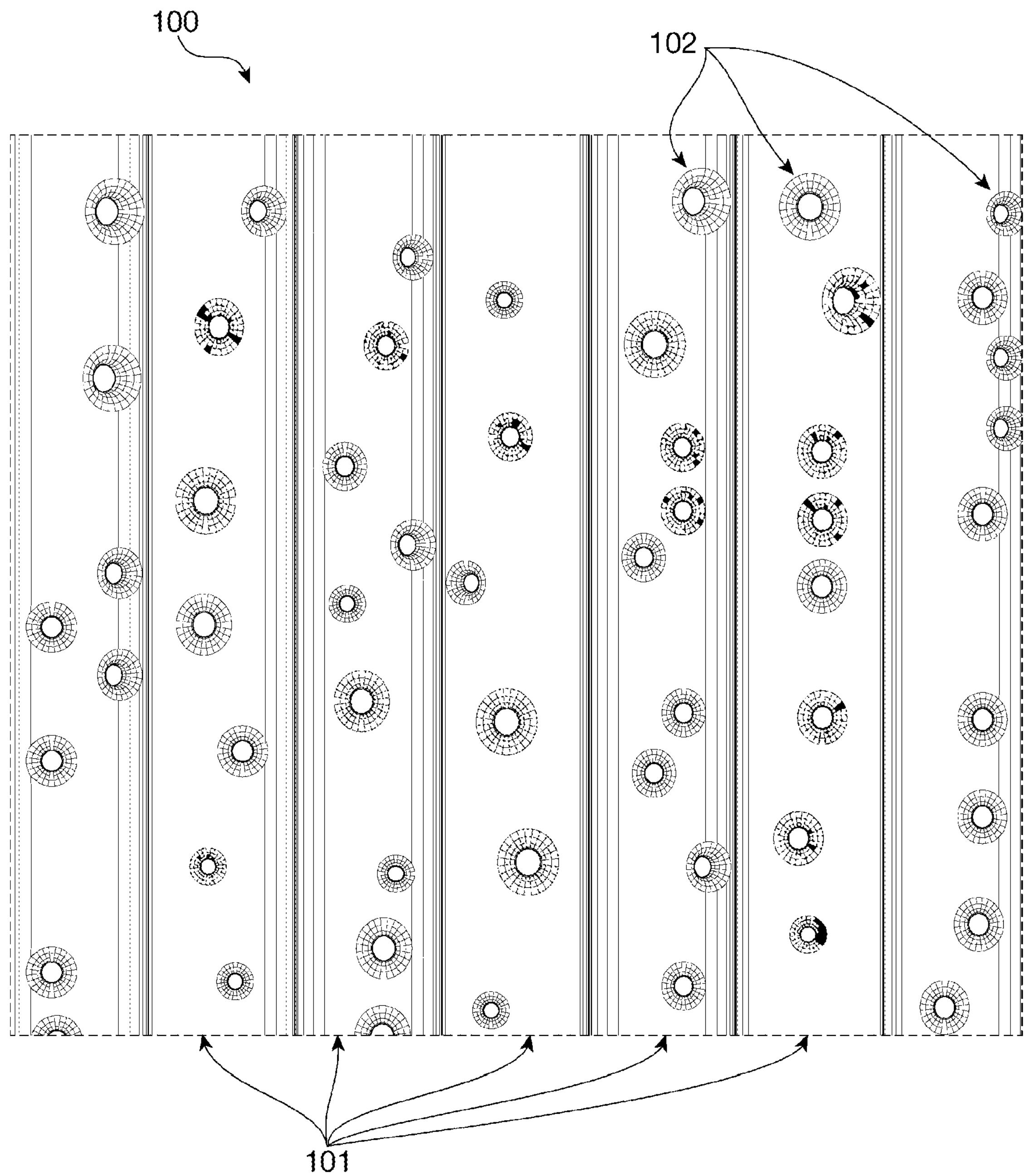
FIG. 3 shows an image of a micro-optic device according to a first embodiment of the present disclosure.

FIG. 3 shows one exemplary embodiment of a micro-optic device 100 in accordance with this embodiment of the present disclosure. The micro-optic device 100 includes a one dimensional array of part cylindrical lenses 101, and corresponding image elements 102 which are associated with a plurality of interlaced images, are formed as recesses in the surfaces of the array of cylindrical lenses 101. Unlike existing micro-optic devices which have optical elements and image elements formed on opposite surfaces of a substrate and often produced using different manufacturing methods, the cylindrical lenses 101 and the recessed image elements 102 are formed as a unitary structure and can be formed in a single manufacturing step on the same side of a supporting substrate.

As mentioned, the image elements 102 are associated with an interlaced imagery comprising a plurality of interleaved image frames. If the image frames are selected from an animation image sequence, then as the micro-optic device 100 is viewed at successive angles, an animation effect will be generated due to the interleaved image frames being displayed at the successive angles.

In this embodiment, the cylindrical lenses 101 are approximately 10 microns in height (i.e. lens sag is 10 microns), 60 microns in width, and have a lens pitch of approximately 63.5 microns. The recessed image elements are approximately 5 microns in depth. It should be appreciated that other configurations of optical elements and image elements are also available as demonstrated below.

Figure 4:
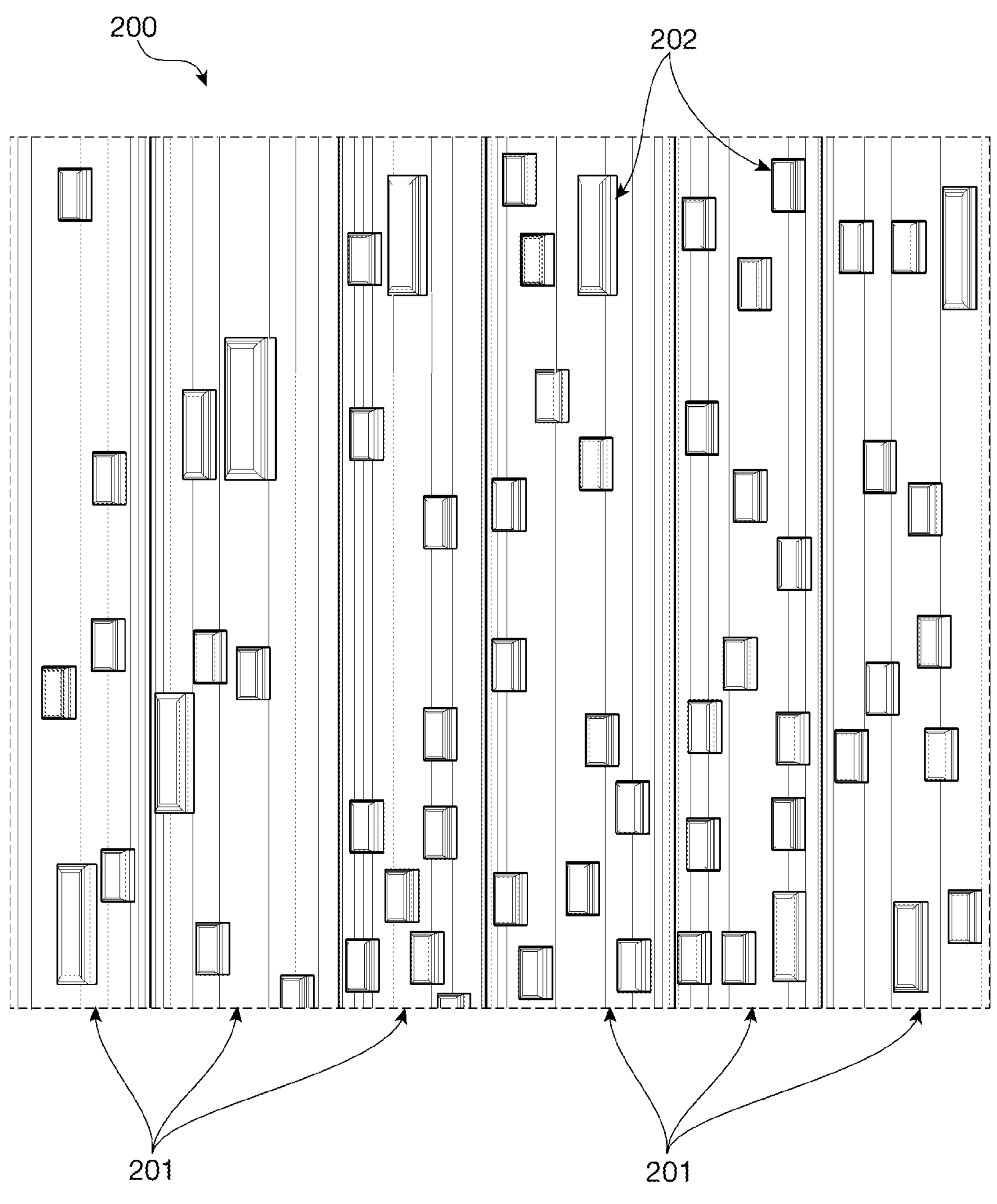
FIG. 4 shows an image of a micro-optic device according to a second embodiment of the present disclosure.

FIG. 4 shows another exemplary embodiment of the present disclosure. In this embodiment, the micro-optic device 200 includes an array of cylindrical lenses 201 and a corresponding array of image elements 202 which are configured to produce a 3D interlaced imagery for a viewer of the micro-optic device. The image elements 202 are formed at various locations within the surface of the cylindrical lenses 201. The device 200 produces a monochromatic 3D floating image when the device is viewed in transmitted or reflected light. "Floating" or "3D" means that the observer perceives the projected image (or some part of it) to be either above or below some reference plane e.g. the substrate could be the reference plane.

In this embodiment, the concave cylindrical lenses have a depth (sag) of approximately 6 microns, and a lens pitch of approximately 50 microns. The image elements 202 are formed as a plurality of square shaped tiles recessed into the surface of the concave cylindrical lenses.

To produce the micro-optic device 200, the same method as described above can be used to produce an embossing roller which includes relief structures directly in the surface of the embossing roller, and the embossing roller is then used in an inline manufacturing process to manufacture the micro-optic device 200 on a moving web.

Alternatively, the embossing roller can be formed by first producing a metal shim, which includes relief structures corresponding to the optical elements and the image elements, and the metal shim is then attached to an embossing roller by suitable means. A sample master which can be reproduced in a shim can be produced by a direct laser writing method, that is, a glass plate is coated with photoresist layer and then an X-Y raster scanning laser beam is focussed on the photoresist surface of the glass plate. The power dosage of the laser beam is spatially varied in X and Y directions, in accordance with the desired structure depth at each point. The structure depth is produced as a greyscale 2D image, in which the greyscale is proportional to the desired structure depth. This greyscale image is then input into the direct laser writing machine. After the laser exposure is completed, the photoresist is developed to produce the 3D single sided micro-optic device as shown in FIG. 4.

Figure 5A:
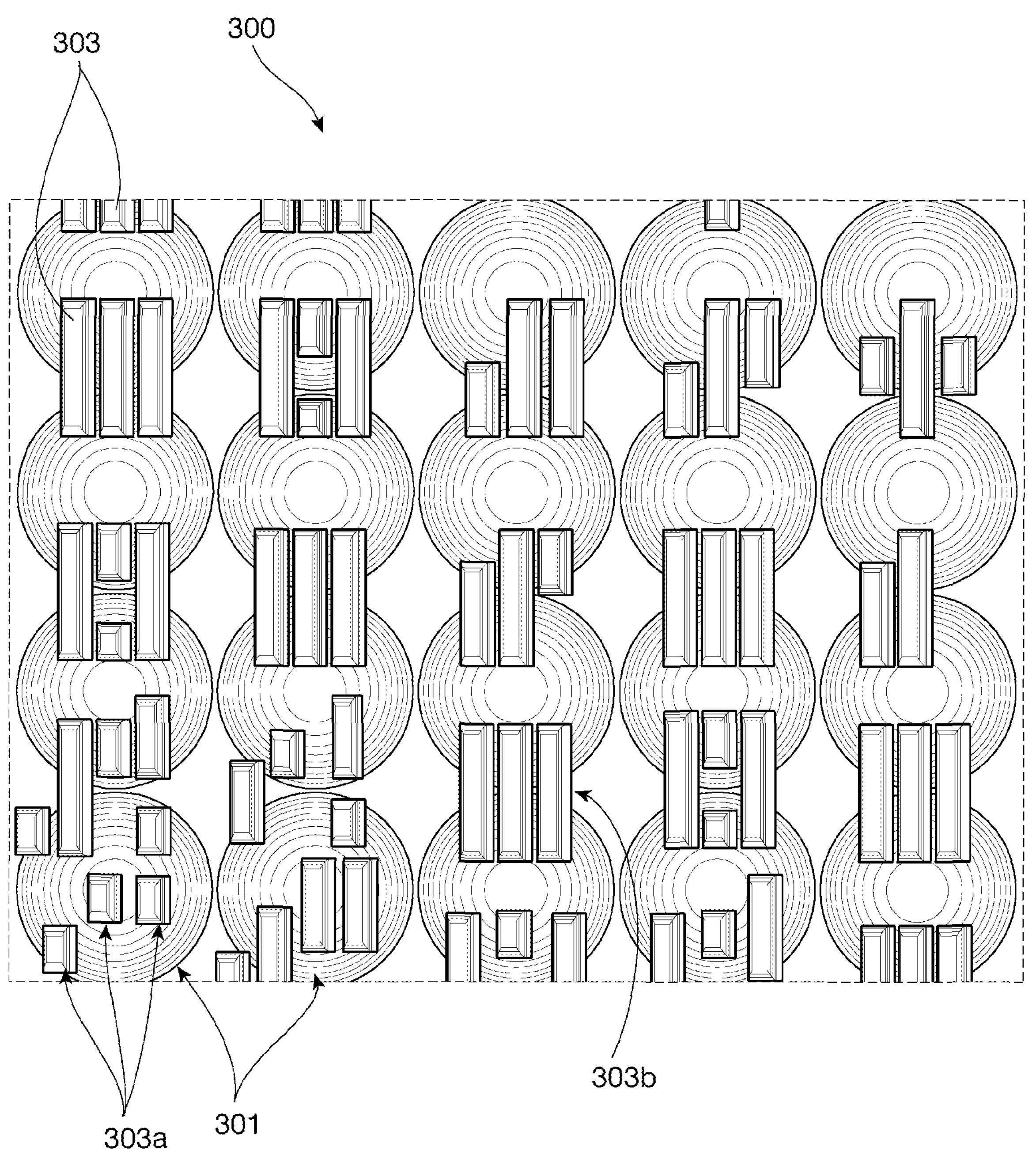
FIG. 5A shows an image of a micro-optic device according to a third embodiment of the present disclosure which includes a 2D round lens array and image elements formed integrally with the round lenses.
Figure 5B:
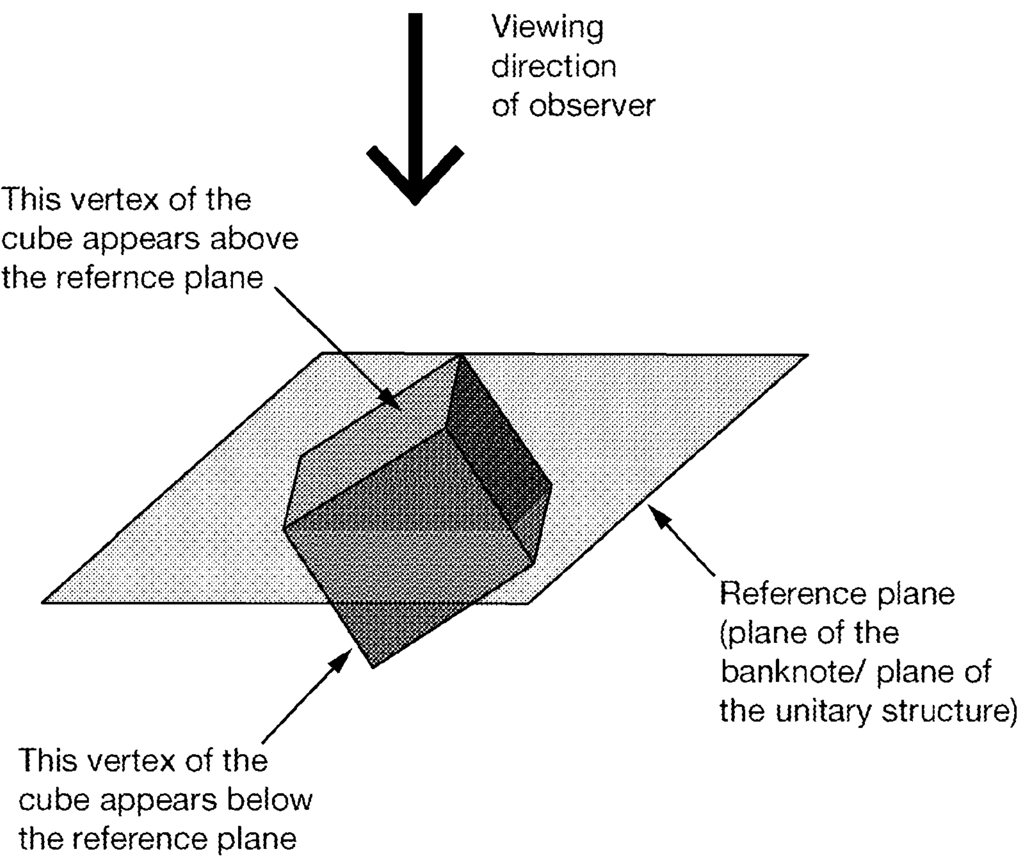
FIG. 5B illustrates the imagery effect of a floating cube.
Figure 16A:
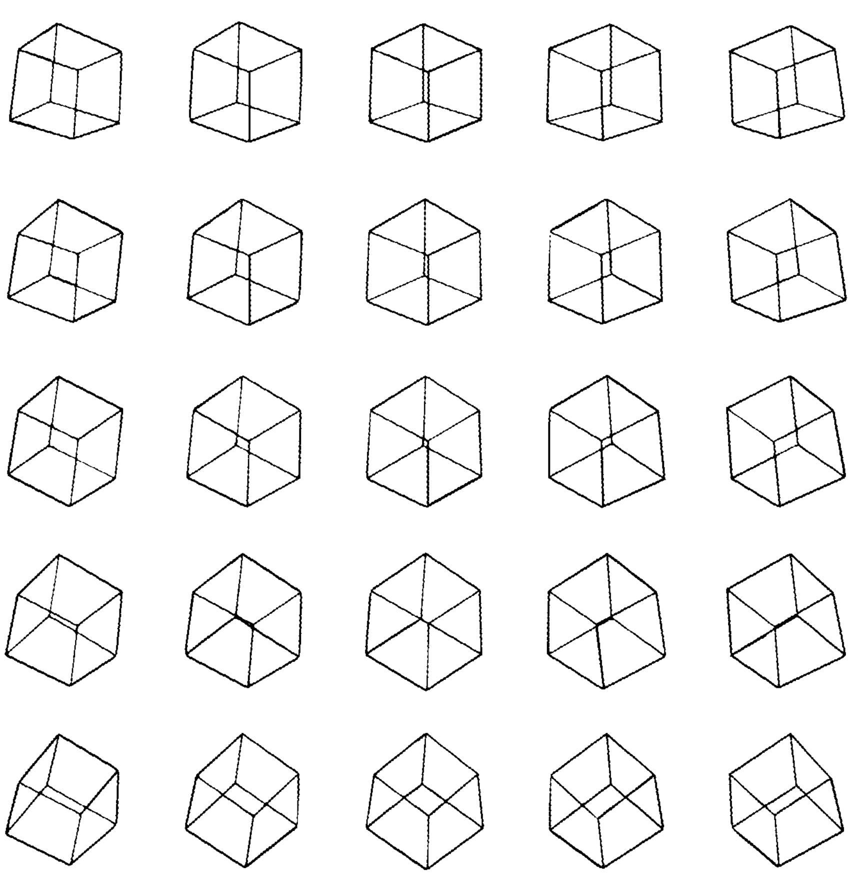
FIGS. 16A and 16B illustrate how a three-dimensional appearance of an object may be generated.
Figure 16B:
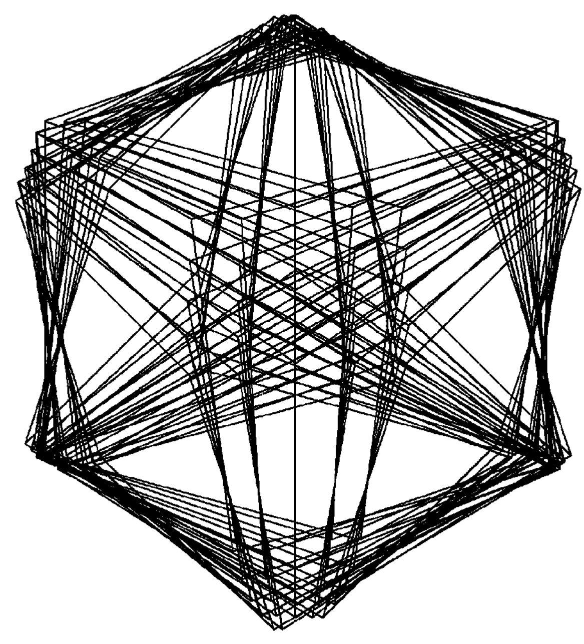

3D imagery effects can also be generated by the micro-optic device including round lenses as opposed to one dimensional cylindrical lenses as optical elements. FIG. 5A shows a microscope image of a micro-optic device 300 including optical elements 301 in the form of two dimensional array of round lenses and integrally formed image elements. The image elements are associated with 5 by 5 interleaved image frames as shown in FIGS. 16A and 16B. The image frames are interleaved in both x and y directions, to arrive at the image shown in FIG. 16B.

In this embodiment, the image elements 303 are again formed in the surfaces of the optical elements such that the micro-optic device is formed as a unitary structure supported on one side of a substrate. The image elements are preferably formed as 10 micron sized pixels, and recessed into the surface the optical elements by about 1 micron. However, it should be noted that at least some of the image elements 303 or portions of the image elements 303 (such as 303*a* and 303*b*) are also formed in spaces between adjacent optical elements 301.

The device of FIG. 5A is configured to produce a 3D floating image of a wireframe cube when viewed in transmitted or reflected light. To the observer, portions of the cube appear to float in front of the micro-optic device 300, other portions appear to float behind the micro-optic device, such as that shown in FIG. 5B. The floating image is observable when the viewer looks at the device from any direction, due to the symmetrical nature of the round lenses. For example, when viewing perpendicular to the surface of the unitary structure surface and rotating the feature about the viewing direction axis, the 3D effects and the image sharpness are still maintained.

Figure 6:
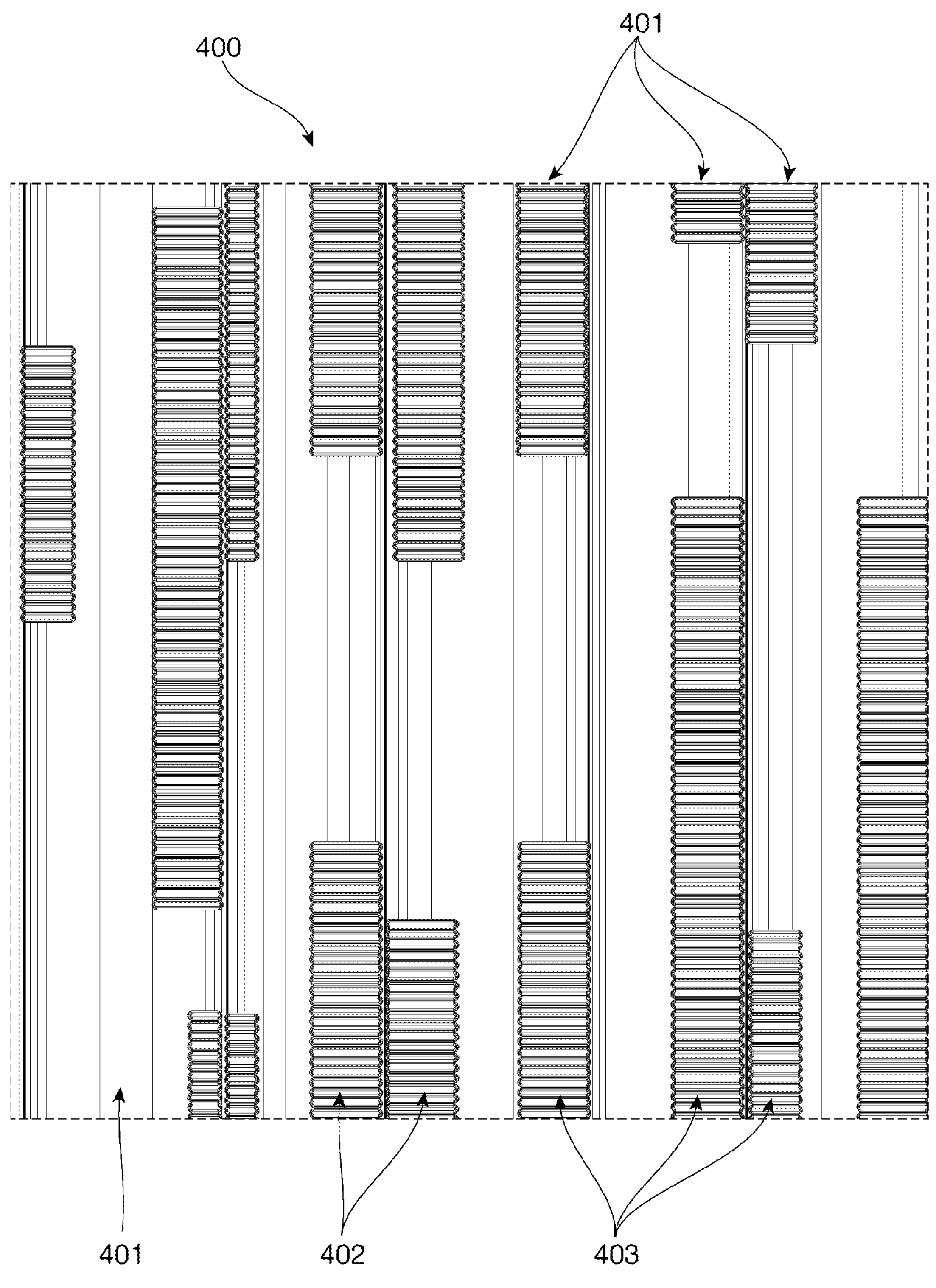
FIG. 6 shows an image of a micro-optic device according to a fourth embodiment of the present disclosure which includes diffractive elements as image elements.

FIG. 6 depicts another exemplary embodiment of the invention. Here, the micro-optic device 400 includes a 1D cylindrical lens array 401 implementing a 2-flip coloured image using diffraction gratings as the image elements 402.

With reference to FIG. 6, the optical elements 401 of the micro-optic device 400 include a 1D array of concave cylindrical lenses. The image elements 402 are formed by 2 interlaced image frames, and include diffraction gratings 403. In one embodiment, the two image frames to be interlaced are greyscale images. In a preferred embodiment, the image designs are dithered halftone binary images, so that the grey levels in the images can be simulated with a binary image consisting of image pixels of fixed size (100 micron by 100 micron for example) but varying frequency, wherein each image pixel comprises diffraction gratings. In the example shown, the diffraction gratings 403 are oriented in a direction perpendicular to the orientation of the cylindrical lens axis.

The micro-optic device 400 can be viewed either in transmission and/or reflection. In transmission, when the device in FIG. 6 is viewed horizontally, that is, when the lenses are horizontal, a 2-image flip effect is observed by moving the structure up or down, or to the left or right, off axis from the light source. In diffused white light, the optical effect observed appears greyscale. In collimated white light, or white light from a point source, the images observed appear in multiple colours, due to the diffraction gratings formed on the lenses.

In reflection, with the lenses oriented horizontally, a 2-image flip effect is observed by tilting about a horizontal axis. In diffused white light, the images observed appear greyscale. In collimated white light (or white light from a point source), the images observed appear in multiple colours, again due to the diffraction gratings formed on the lenses.

In an alternative embodiment, through appropriate selection of grating frequency, depth, and orientation, the image projected by the micro-optic device 400 can be a true colour image. For example, the grating frequency, depth and orientation can be selected so as to project a 2D array of RGB coloured image pixels, to produce a desired full colour image intended to be observed at a particular angle (for a particular angle of incident substantially collimated white light).

Notably, the diffraction gratings 403 can occupy areas corresponding to the imagery background, or can occupy areas corresponding to the imagery foreground, or both. In general, the grating frequency and the grating direction (measured in the local surface plane of the sampling element) can be spatially varied, continuously or discretely, over the entire area of the unitary structure, depending on the image to be generated by the micro-optic device. According to the diffraction equation, the colour projected to the observer depends on the grating frequency and grating direction at each point on the surface of the optical elements 401 (frequency of 0 means there are no gratings at that point). It also depends on the position of the light source and the observer's viewing angle. Thus by using appropriate spatial distribution of local grating frequency and local grating direction, over the surface of the optical elements, it is possible to produce full colour images, using either 1D cylindrical lens arrays or 2D round lens arrays as the optical elements of the micro-optic device.

The diffraction gratings 403 applied to the surface of the 1D cylindrical lens array 401 can be oriented parallel to the cylindrical lens axis, or perpendicular to it, or at other selected angles.

Figure 7A:
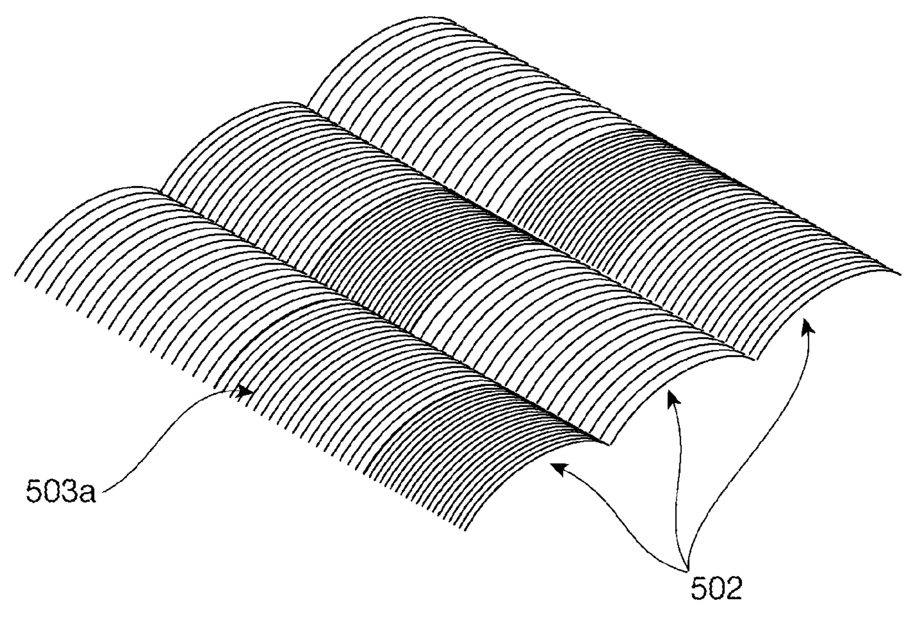
FIGS. 7A and 7B show alternative embodiments of a micro-optic device of the present disclosure wherein FIG. 7A includes diffractive elements formed in the surface of a lenticular array, and FIG. 7B includes diffractive elements formed in the surface of a round lens.

FIG. 7A shows an embodiment where the diffraction gratings 503*a* cover the entire surface area of the cylindrical lenses 502. In other embodiments, they may only cover portions corresponding to the background of the imagery, or to the foreground of the imagery to be observed by a user.

Figure 7B:
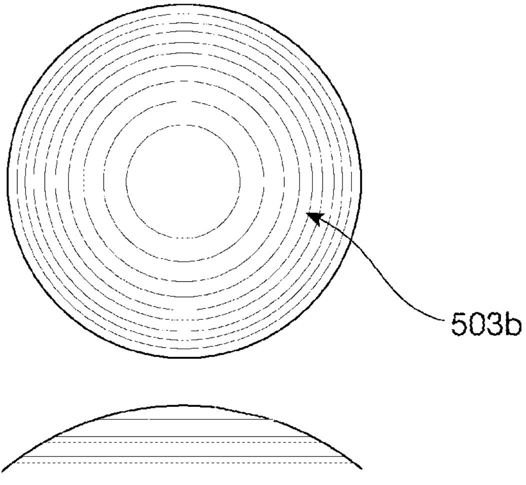

In another non-limiting example as illustrated in FIG. 7B, diffraction gratings 503*b* are applied to the surface of 2D round lens arrays as a series of concentric rings. The local frequency of the diffraction gratings 503*b* can be radially and angularly varied relative to the lens vertex to project desired colour distribution to the observer. Again, the diffraction gratings 503*b* can cover the entire spherical surface of the lens, or only selected portions which either correspond to the background or to the foreground of the imagery design.

Figure 8:
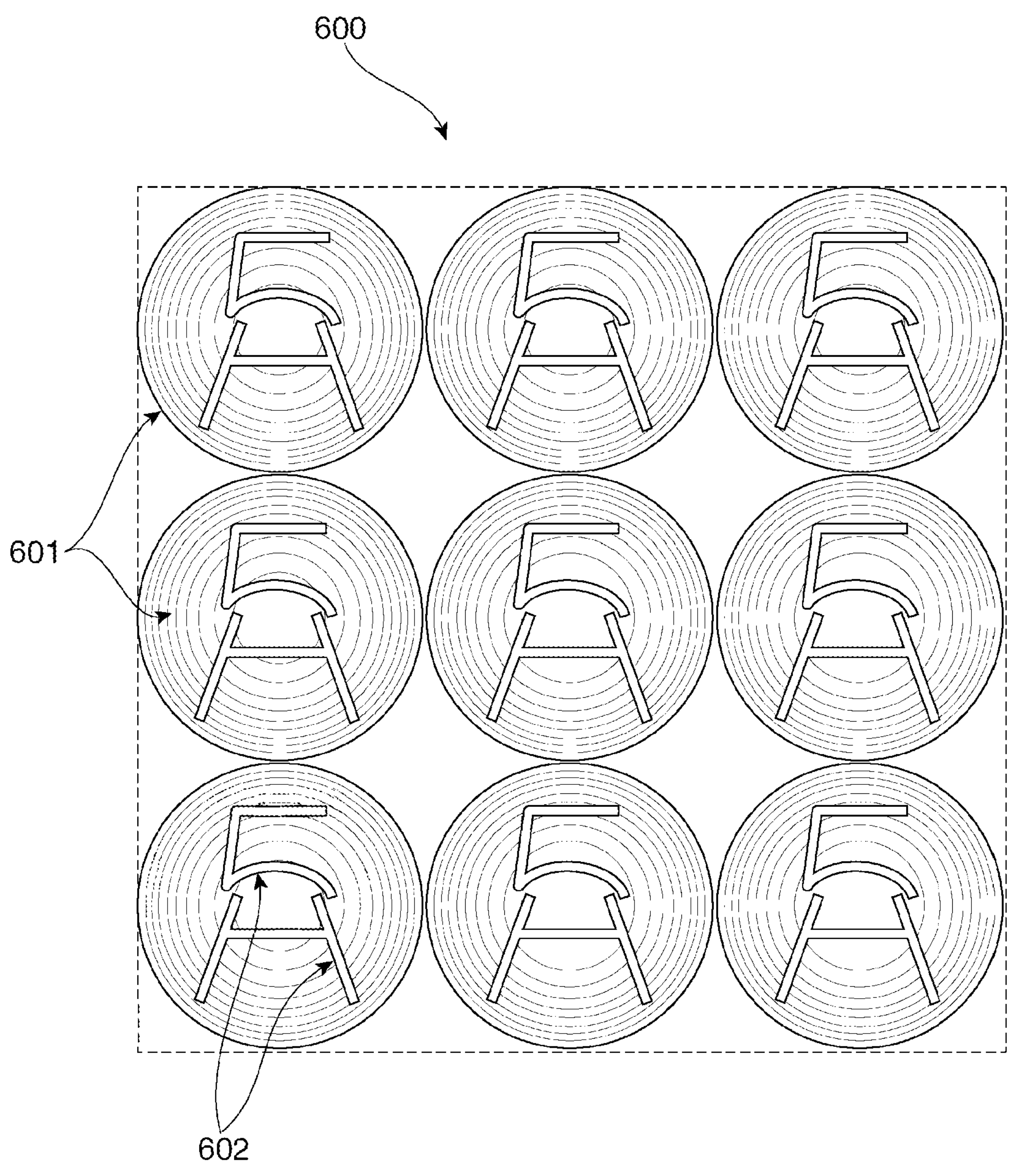
FIG. 8 shows an image of a micro-optic device according to another embodiment of the present disclosure which is configured to generate a two-image flip moire magnification effect.

Other than the aforementioned animation effect and 2-image flip effect, the present invention can also be configured to generate switching moire effects. FIG. 8 shows an example of a moire magnification device 600 which shows a switching effect between moire magnified 5 and A upon tilting or rotation of the viewing angle. The period of the image elements 602 corresponding to the 5 and A can be adjusted to achieve the required depth of each constructed image. In this embodiment, the image elements 602 are formed as micron sized letters, numbers, or objects on the surface of the optical elements 601.

Figure 9:
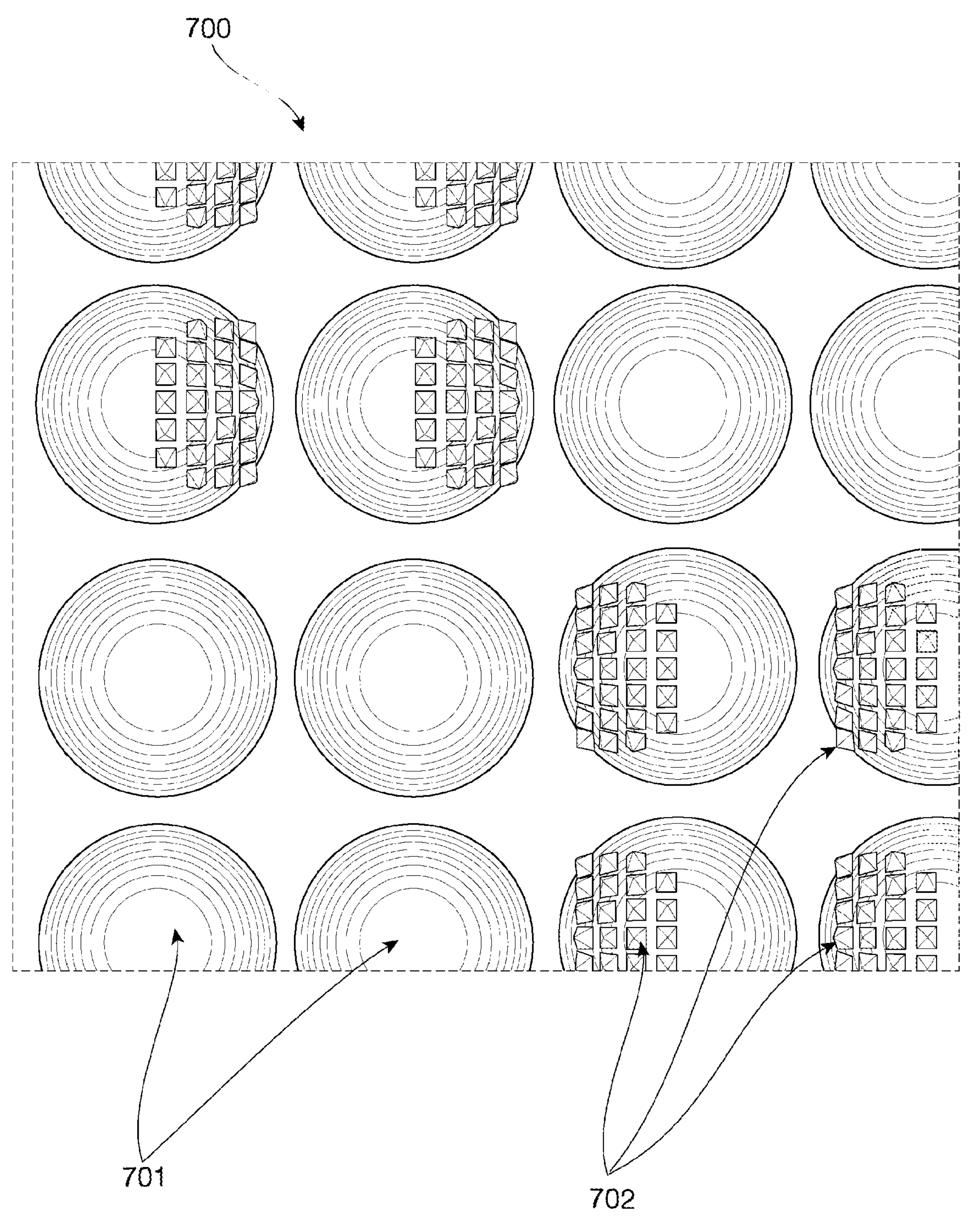
FIG. 9 shows an image of a micro-optic device according to another embodiment of the present disclosure which includes image elements formed as an array of sub image elements such as dots.

FIG. 9 shows another microscopic image of an embodiment of the micro-optic device 700 including two dimensional round lenses 701 and two-channel interlaced imagery design. In this example the 1$^{st}$ image channel occupies (approximately) the left half of each round lens, and the 2$^{nd}$ image channel occupies (approximately) the right half of each round lens. Theoretically, in areas where the two image channels overlap, the imagery occupies the entire lens area. Therefore, if solid imagery elements are used, the performance of the optical elements may be impacted due to the reduced surface area of the optical elements occupied by the imagery elements. To improve the sampling efficiency of the optical elements, internal details have been introduced to the image elements, such as that shown in FIG. 9. Each imagery element 702 is formed as an array of substantially similar sized dots, rather than a rectangular shaped tile such as that shown in FIGS. 4 and 5. This construction allows the non-imagery area of each lens to be increased, which in turn improves the sampling efficiency of the lenses 701. When the micro-optic device 700 is viewed in white light (for example using the LED illumination of a mobile phone), improved contrast of the displayed image is observed.

This method of increasing effective sampling area of an optical element, can be readily applied to other embodiments of the present disclosure.

Figure 10A:
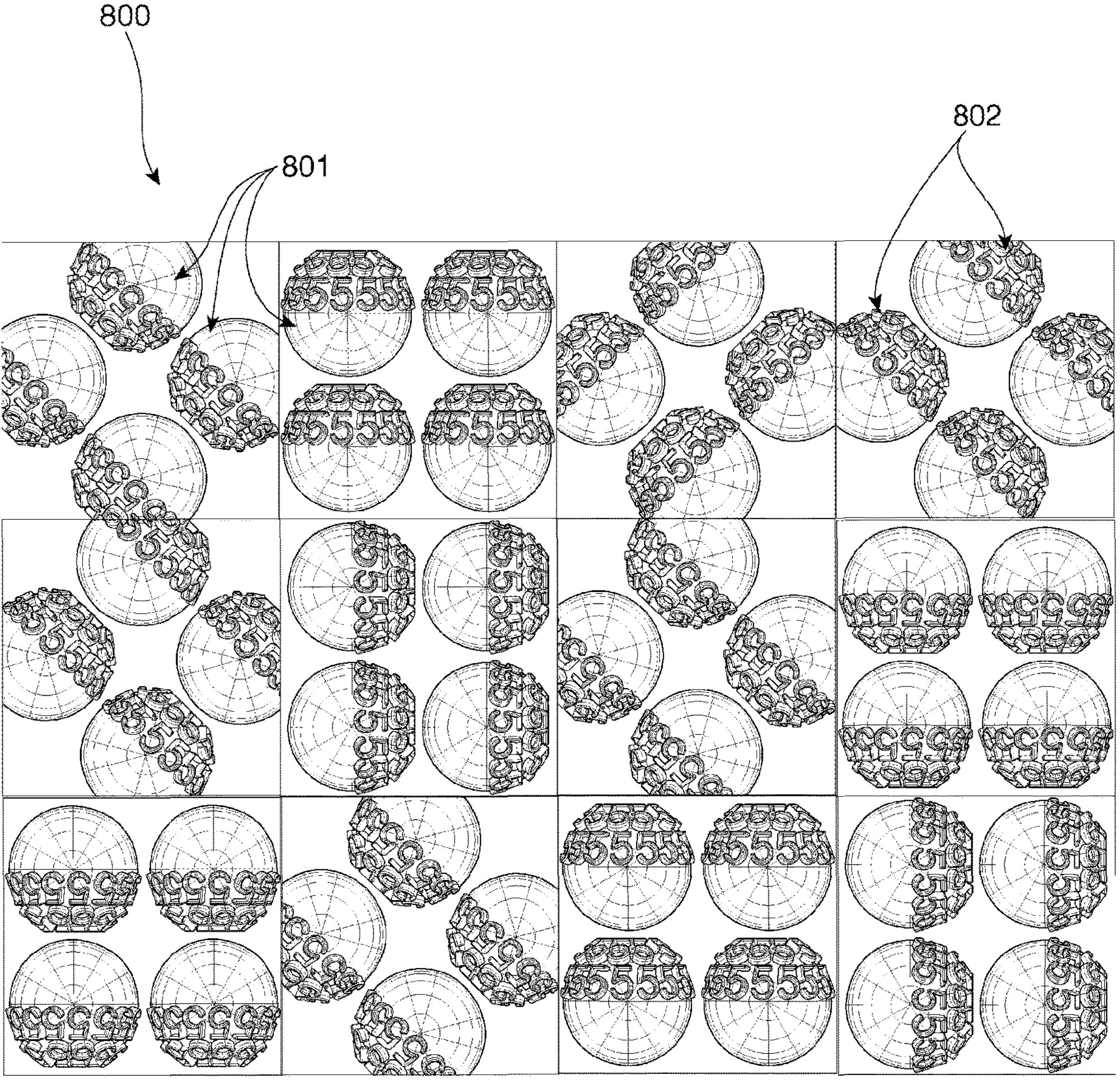
FIG. 10A shows an image of a micro-optic device according to another embodiment of the present disclosure which includes rotating image elements of the micro-optic device in an angular rotation.
Figure 10B:
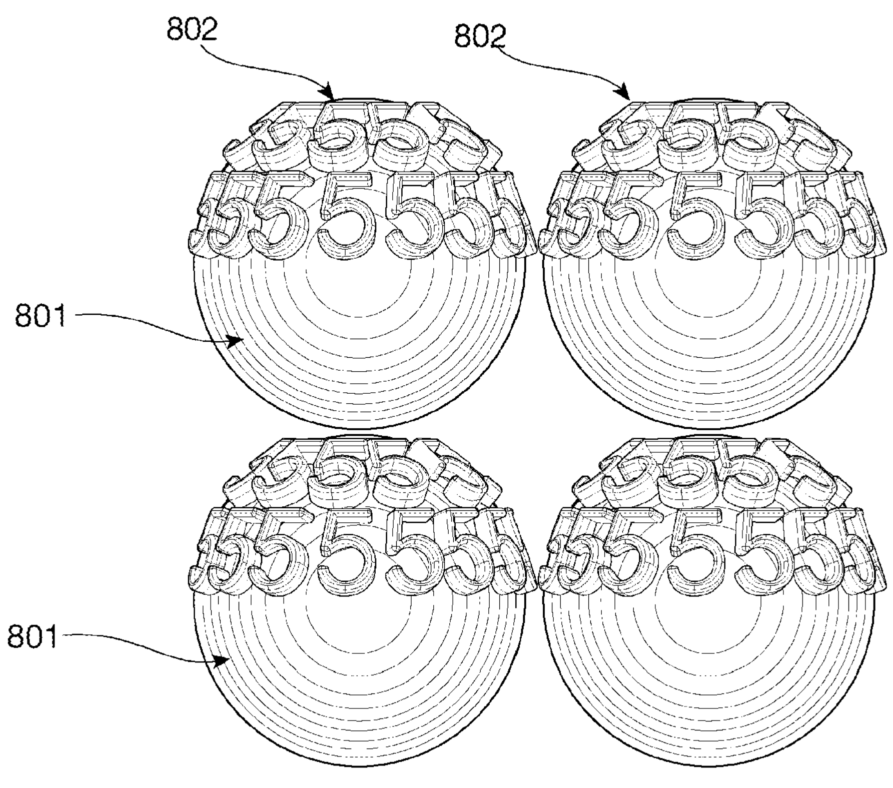
FIG. 10B shows an enlarged view of a 2 by 2 lens group of the embodiment of FIG. 10A.

FIG. 10A shows another microscopic image of an embodiment of micro-optic device 800 including two dimensional array of round lenses 801. The image elements 802 are again integrally formed with the optic elements 801. The lenses (and their associated imagery elements) are rotated in 2×2 lens groups. The angular rotation is a function of an input greyscale value derived from an input greyscale image. The image elements occupy approximately half of the lens surface area and comprise micro text '5', which is more clearly illustrated in FIG. 10B. The lenses 801 are divided into 2×2 groups, and each group of lenses are angularly rotated with respect to its adjacent lens groups. As the image elements 802 are formed as an array of sub elements, the total sampling area that is available in each lens is increased as compared to using solid image elements that occupy a much larger portion of the lens surface area.

Double Sided Visual Effects

In accordance with another aspect of the present disclosure, the micro-optic devices described above are also capable of generating optically variable effects which are observable from both surfaces of the substrate, and the observed optically variable effects are different when viewed from different surfaces of the substrate. An exemplary embodiment will be described below with reference to FIG. 11.

Figure 11:
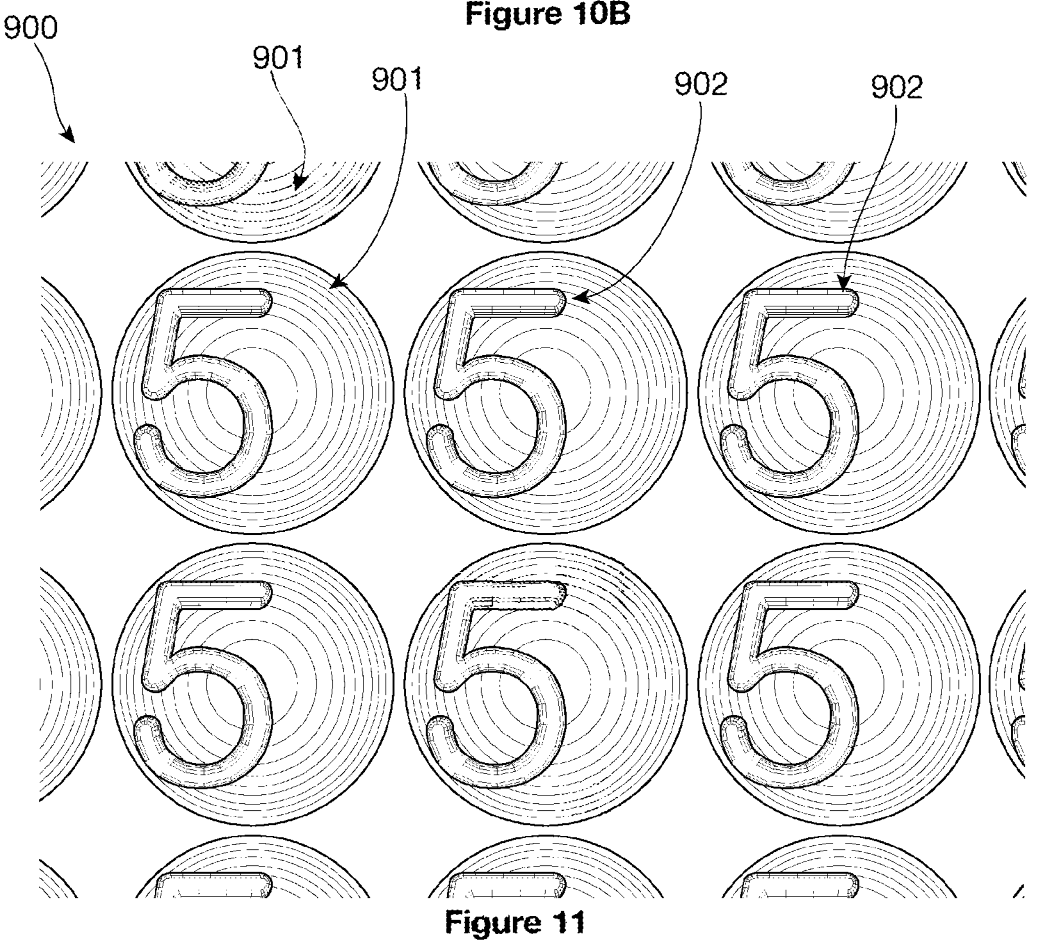
FIG. 11 shows an image of a micro-optic device according to another embodiment of the present disclosure which is configured to generate two different optically variable effects from two opposite surfaces of the micro-optic device.

FIG. 11 shows a micro-optic device 900 including a 2D round lens array as the optical elements 901, and moire magnifying image elements 902 directly formed in the surfaces of the round lenses. The lenses are shown as concave lenses in the FIG. 11, but other lens configurations are also possible. The image elements 902 are again recessed into the lens surface, by about 1 micron. The image elements 902 can be confined to the surface of the lenses, or may additionally occupy the space between the lenses.

When this device is viewed from the side of the substrate which carries the micro-optic device 900, in reflected light, the moire magnified image of the numeral 5 appears to float in front of the device. When viewed from the opposite side in reflected light, the moire magnified image of the numeral 5 appears to float behind the device. This embodiment allows the 3D depth of the projected image to be inverted when viewing from one side compared to the other. Such effect can be used for authentication purpose and is a unique optically variable effect which is not available with the existing moire magnification devices.

When the same device is viewed in transmitted light, the displayed imagery effects are different. When viewed from the side of the substrate which carries the micro-optic device, the moire magnified image of the numeral 5 appears to float behind the device. When viewed from the opposite side, the moire magnified image of the numeral stays unchanged. This means the 3D depth of the projected image is the same when viewing from one side compared to the other in transmitted light. In combination with the optical effects described above, the device provides a unique combination of optically variable effects which would be particularly useful for authentication.

In this embodiment, it is understood that when viewing in reflected light, from the side which carries the micro optic device 900, the constructed image is a real image floating in front of the structure, whereas when viewing from reverse side in (total internal) reflection, the constructed image is a virtual image that appears to float behind. For micro-optic devices with convex lenses, this depth inversion behaviour is reversed.

Micro-Optic Device Including Composite Optical Elements

Figure 12:
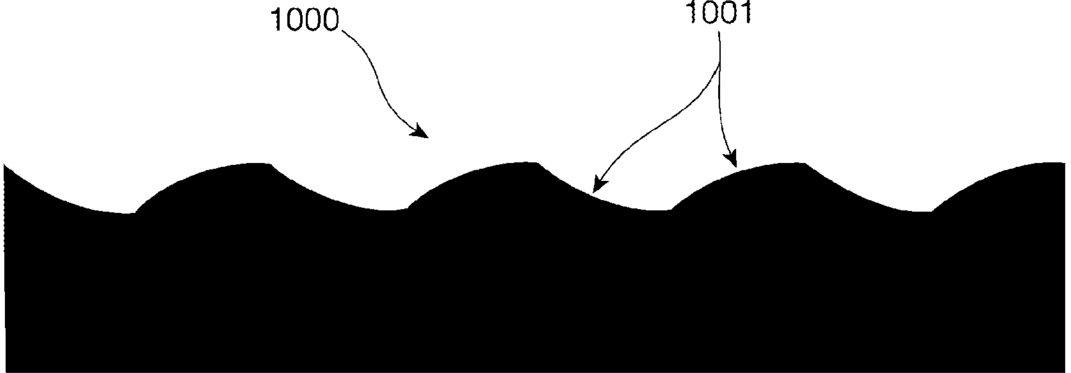
FIG. 12 shows a cross-sectional view of a micro-optic device according to another embodiment of the present disclosure including part concave and part convex optical elements.

FIG. 12 schematically illustrates another embodiment of the invention, which includes a micro-optic device 1000 including composite optical elements 1001 (image elements are not shown). In this example, each optical element 1001 is part concave, and part convex, and both portions are arranged to produce an optical effect by sampling image elements (not shown). At some viewing angles, the displayed imagery is produced by the concave portion of the optical elements 1001, and at other viewing angles, the displayed imagery is produced by the convex portion of the optical elements 1002. This would enable the micro-optic device to display an imagery that changes its perceived depth (from below to above, or vice versa) when the viewing angle changes. In another embodiment, it may generate a 3D image which switches in depth when the device is tilted or rotated. In another embodiment, it may generate a 3D flipping image, that is, a 3D image which switches in depth and which also changes its form when the device is tilted or rotated.

Figure 13:
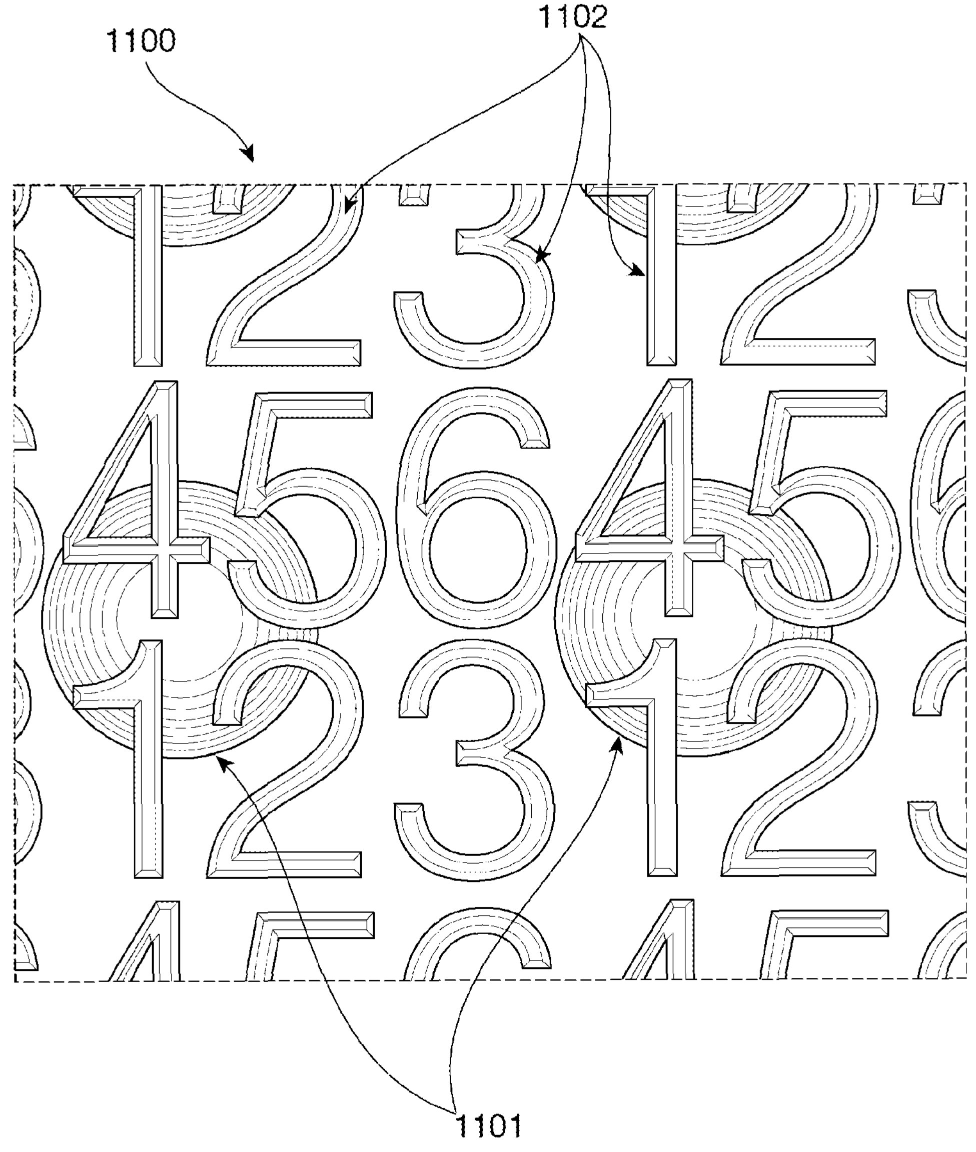
FIG. 13 shows an image of a micro-optic device according to another embodiment of the present disclosure which includes image elements formed in spaces between adjacent optical elements.

Single Layer Micro-Optic Device Wherein the Image Elements are Partially Located in Spaces Between Adjacent Lenses FIG. 13 illustrates another aspect of the present invention, in which some of the image elements of the micro-optic device are partially integrally formed with the optical elements, and some image elements are partially or completely located in spaces between the optical elements. 101.341 FIG. 13 shows an image of micro-optic device 1100 including round lenses as the optical elements 1101, and image elements 1102 include a repeating array of numeral 1, 2, 3, 4, 5, and 6. This device 1100 is configured to display moire magnified numerals 1-6 to a viewer. The lenses have a diameter of d, and a pitch of p, and d is sufficiently smaller than p such that there is sufficient space between adjacent lenses to accommodate some of the image elements 1102. For example, numerals 1, 2, 4 and 5 are partially integrally formed with the lens surface, but also partially formed in the spaces where no lenses are present. Numeral 3 and 6 are only located in spaces between the lenses.

By way of example only, the optical elements 1101 in this embodiment have a diameter of 56 micron, and the distance between adjacent lenses is approximately 100 microns (i.e. from the centre of one lens to the centre of its adjacent lens). The numerals 1-6 are arranged in a rectangular array which has a similar pitch to the pitch of the lenses, in order to produce moire magnification effect. For example, the pitch of the array of image elements 1102 is approximately 98.8 micron.

When the device is viewed in transmission or reflection, a 3D floating image of the numerals 1 2 3 4 5 6 will be observed. The moire magnified numerals should be approximately 8 mm in size so each of the 6 numerals could be clearly discerned with naked eye.

Figure 14:
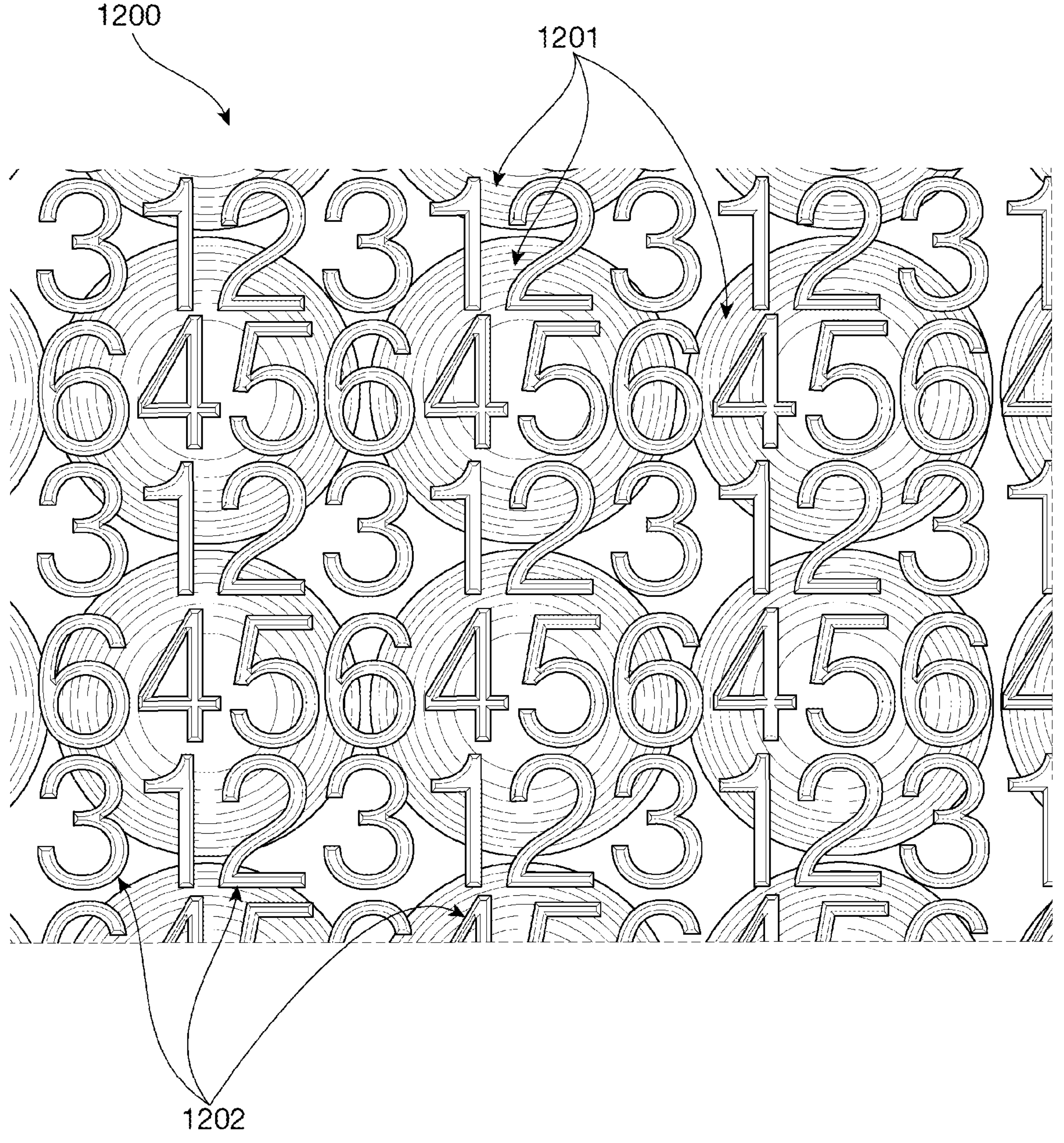
FIG. 14 shows an image of a micro-optic device according to another embodiment of the present disclosure which includes image elements partially formed in spaces between adjacent optical elements.

FIG. 14 shows an alternative embodiment which also includes round lenses 1201 and an array of 1 2 3 4 5 6, however, the distance between adjacent lenses is much smaller than the embodiment shown in FIG. 13. The images displayed by this embodiment proved to be poor compared to the embodiment shown in FIG. 13.

The embodiment of FIG. 13 offers a significant advantage because it allows more complex imagery designs to be implemented, especially more complex moire imagery and integral imagery designs since there is now a larger area made available per optical element.

Figure 15:
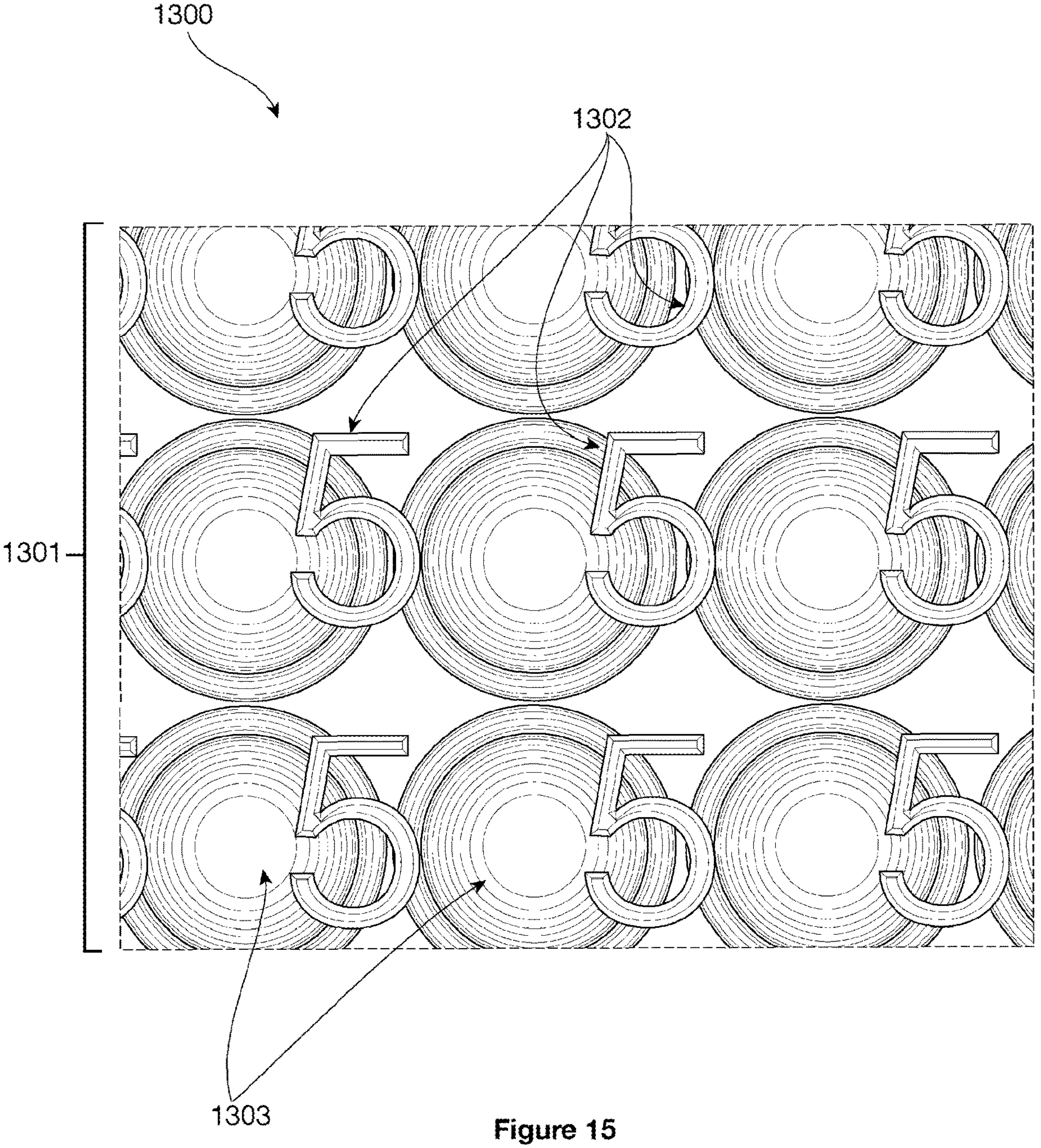
FIG. 15 shows an image of a micro-optic device according to another embodiment of the present disclosure which includes image elements partially formed in spaces between adjacent optical elements.

FIG. 15 shows another embodiment of a micro-optic device 1300 which includes 2D Fresnel lens array 1301 and moire magnifying imagery 1302. The optical elements 1301 include Fresnel Lenses 1303, which have the advantage of reducing the overall thickness of the micro-optic device 1300, thus reducing quantity of the embossable coating that is required for producing the device. Another potential advantage is that for a given structure depth, the width/pitch of the lenses can be increased, and the increased area enables more imagery information to be included per optical element area, enabling more complex optical effects to be produced.

In another embodiment, diffractive lenses or diffractive zone plates may be used instead of Fresnel lenses. Diffractive lenses and zone plates are thinner compared to round lenses or cylindrical lenses, and therefore will also have the same advantages as mentioned above.

Optionally, the various micro-optic devices described above may be overcoated with a thin or thick reflective coating. A thick reflective coating protects the micro-optic device from mechanical copying, a thin reflective coating increases the visibility of the optical effects generated by the micro-optic device and still allows the effects to be observed from either side of the substrate.

Optionally, the micro-optic device is overcoated with a reflective coating followed by a clear protective coating, sufficiently thick such that the resultant structure has a substantially planar upper surface. Again, the clear planar coating, when combined with the reflective coating, protects the micro-optic device from being mechanically copied.

Optionally, the micro-optic device is over-coated with a clear protective coating, wherein said protective coating has refractive index that is different from the material used to form the optical elements and the image elements, to preserve the optical effects.

The micro-optic devices as described above can also be implemented in a foil, and the foil is then optionally attached to an opaque or transmissive portion of a banknote substrate.

For embodiments where the foil is attached to an opaque portion of a banknote substrate, it is preferable to coat the unitary structure with a reflective layer. This is to maintain visibility of the optical effects when viewing the foil directly. The optical effects will not be visible from the reverse side, if the foil is attached to an opaque banknote substrate. The reflective layer may be located in between the unitary structure and the opaque substrate, or alternatively it may be located in between the unitary structure of the micro-optic device and the observer. If it is located between the micro-optic device and the observer, i.e. as an overcoat, a thin reflective layer is preferred, and the thin reflective layer substantially follows the contours of the optical elements and the image elements. A protective coating may also be preferred to prevent copying. Examples of foils including micro-optic devices of the disclosure are shown in FIGS. 17A and B.

Figure 17A:
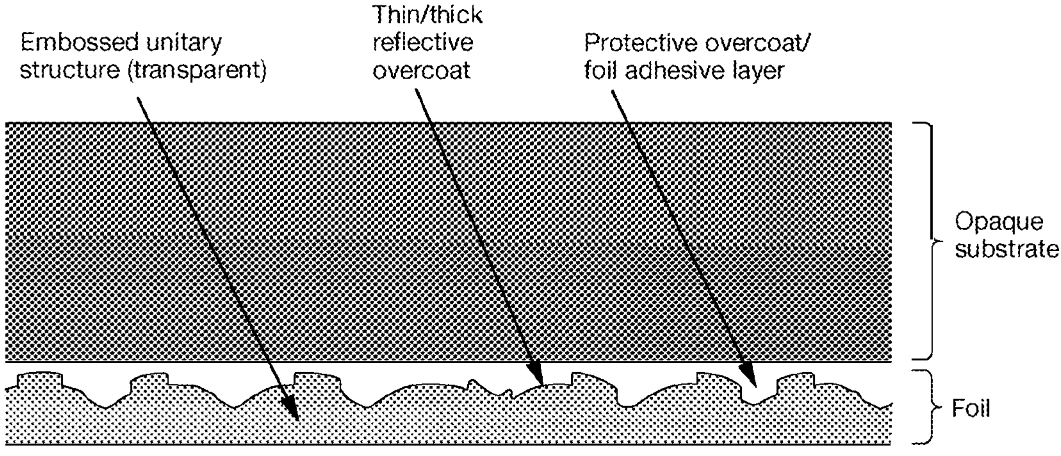
FIGS. 17A and 17B illustrate an embodiment in which the micro-optic device is incorporated into a foil.
Figure 17B:
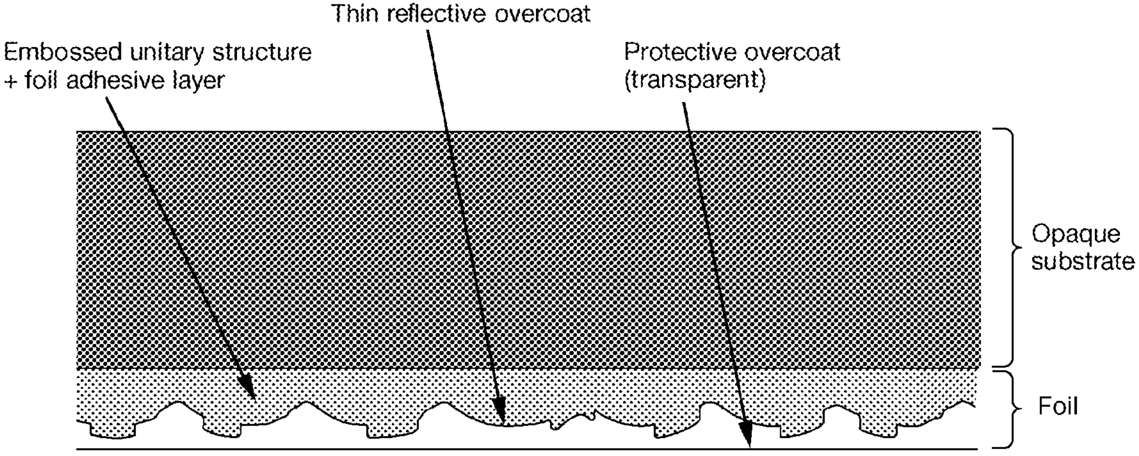

FIG. 17A shows a foil including a micro-optic device of the present invention attached to an opaque substrate. A reflective layer is provided between the opaque substrate and the unitary structure. FIG. 17B shows an alternative embodiment in which a thin reflective overcoat is provided between the unitary structure and the observer.

Imagery Designs with Reduced Data

For magnifying moire designs, or integral imagery designs, which implement micro images that take up a relatively small portion of the area of each micro lens/sampling element (typically, less than or equal to 50%): the implementation of such designs in accordance with this invention is straight forward i.e. standard design techniques can be used to design the imagery layer. Because such designs occupy a relatively small proportion of the area of each micro lens/micro sampling element (typically <=50%), the sampling performance of each sampling element is sufficient to reconstruct an image having sufficient contrast (particularly so if structure is illuminated with mobile phone flash light).

However, problems arise when the percentage area occupied becomes larger (than say 50%) because a large proportion of each sampling element's geometry has been modified by the imagery and so the sampling efficiency is greatly reduced.

This problem can occur for some moire or integral imagery designs, for example those which implement an image design consisting of an object without any internal detail (e.g. an object silhouette).

This problem can also occur for designs based on interlaced image frames (for example: interlaced 3D/floating images, interlaced multiple image frame animations, interlaced 2-flip image effects, contrast switching effects) particularly if the image frames (that are interlaced) have overlapping image areas. For example, if the design consists of 6 interlaced frames, then in areas where 3 or more frames overlap, the imagery will occupy at least 50% of the area of each micro lens/sampling element, and so the problem will occur.

To overcome this problem, the imagery must be modified (or constructed differently from first principles) so that the area of each optical element occupied by the imagery is reduced, preferably ensuring the changes applied to the imagery are uniformly applied to the entire imagery design (thus ensuring a consistent result in all areas of the design).

Figure 18:
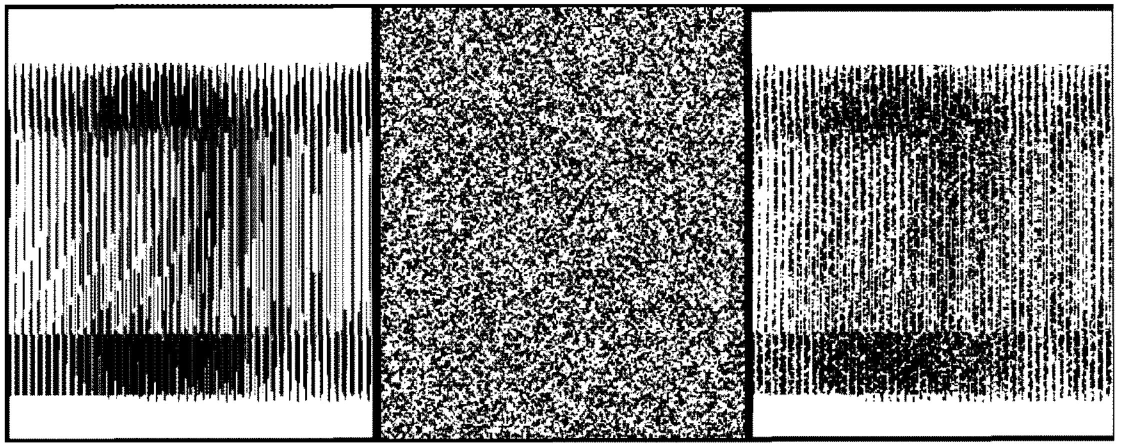
FIG. 18 shows a method of removing image data from the interlaced images.

One approach that may be used is to apply random noise to the imagery design. For example, if the interlaced, or moire, or integral imagery design is a monochromatic (binary) design, consisting of a black image on a white background, and the black image is to be applied to the sampling elements, then the problem could be solved by applying 50% random white noise to the image (i.e. 50% of the pixels that make up the imagery file are converted to white pixels—so as to remove portions of the imagery). This will ensure that no more than 50% of each sampling element will be filled with imagery. An example is provided in FIG. 18 which includes a source image, a mask image, and a processed image with reduced data. The middle image is a mask used to apply 50% white noise pixels to the source image on the left. The image on right is the final image after application of 50% white noise.

Another approach is to insert "blank" image frames into the sequence of frames that are to be interleaved or interlaced. For example, if the imagery design consists of 4 image frames, say ABCD, and each image frame is a monochromatic image consisting of a black foreground on a white background (wherein the black portions, after interlacing, are to be applied to the sampling elements) then a blank frame (consisting of a white background only) can be inserted uniformly into the frame sequence thus: AxBxCxDx (x denotes the blank frame), the set of 8 frames are then interlaced (rather than the original 4). This method is also able to achieve a reduced image element area on each optical element (i.e. no more than 50% of each sampling element will be filled with image elements).

Another approach, is rather than introducing blank frames as per above, some image frames may be deliberately omitted (or equivalently, image frames are replaced with blanks i.e. white space). This can be done uniformly so that each frame (within the unique frame set) is equally effected. For example, if the imagery design consists of 4 image frames, say ABCD, and each image frame is a monochromatic image consisting of a black foreground on a white background (wherein the black portions, after interlacing, are to be applied to the sampling elements) we start by interleaving the 4 frames (as per standard interleaving):

| | | | | | | | | | |
|---|---|---|---|---|---|---|---|---|---|
| ABCD | ABCD | ABCD | ABCD | ABCD | ABCD | ABCD | ABCD | ABCD | standard interleaving |

Then starting from say the 1st frame A in the above standard interlaced image sequence, every 5th frame may be omitted, this gives the following result ("-" denotes an omitted frame i.e. a frame filled with white space). The image-free lens area has been increased by an average of 20% (20%=⅕×100) resulting in improved sampling efficiency.

| | |
|---|---|
| ABCD ABCD ABCD ABCD ABCD ABCD ABCD ABCD ABCD | standard interleaving |
| ABCD -BCD A-CD AB-D ABC- ABCD -BCD A-CD AB-D | omit every 5th frame starting from A |

To effect further reduction of lens area occupied by imagery, the above process can be repeated, but this time the frames are counted from a different position/offset. For example, rather than starting the count from frame A, counting could start from frame C, and again every 5th frame is omitted, to generate the result below ("-" denotes further omitted frames, filled with white space). With this approach, the image-free lens area has been increased by an average of 20% i.e. the total average image-free area increase per lens is now 20+20=40%, resulting in further improved sampling efficiency.

| | |
|---|---|
| ABCD ABCD ABCD ABCD ABCD ABCD ABCD ABCD ABCD | standard interleaving |
| ABCD -BCD A-CD AB-D ABC- ABCD -BCD A-CD AB-D | omit every 5th frame starting from A |
| -BCD -B-D A-C- AB-D -BC- A-CD -B-D A-C- AB-D | omit every 5th frame starting from C |

The frame omission/blanking process above can be applied further times if required, and different frequency (period) of frame omission can be used. Process can be applied with 1D lens arrays and also with 2D lens arrays. Similar imagery design techniques are described in PCT/AU2019/050088, the content of which is incorporated herein by reference in its entirety.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

It will be understood that the invention is not limited the specific embodiments described herein, which are provided by way of example only. The scope of the invention is as defined by the claims appended hereto.

The present disclosure are summarised in the following statements:

In one aspect the present disclosure provides a micro-optic device, comprising:

a substrate, including a first surface and a second surface;

optical elements; and image elements, wherein the image elements are associated with a plurality of interlaced images, and the image elements are arranged to be sampled by the optical elements to produce an optical effect, wherein the optical elements and the image elements are integrally formed as a unitary structure located on the first or the second surface of the substrate.

In one embodiment, the optical elements comprise a one-dimensional lens array of part cylindrical lenticular lenses. In another embodiment, the optical elements comprise a two-dimensional array of round lenses. In other embodiments, the optical elements may be 1D or 2D Fresnel lens array, or a 1D or 2D diffractive zone plate (DZP) lens array.

In one embodiment, the image elements are associated with interlaced images which represent an animation, such that the micro-optic device displays an animation effect when the device is viewed at successive angles.

In another embodiment, the image elements are associated with interlaced images which represent a 3-dimensional (3D) appearance of an object or a scene, such that the micro-optic device produces a 3D optical effect. In one embodiment, the image elements are formed as fixed size image pixels. The image pixels are of a fixed size, for example, approximately 10 microns. In one embodiment, the image pixels are of a square or a rectangular shape and are recessed into or protruding from the surface of the optical elements.

In another embodiment, the image elements are associated with two interlaced images, such that the micro-optic device produces a two-channel image flip effect for the viewer. In one embodiment, the two interlaced images produce a 2-channel image flip effect in which one of the image channels is blank/void, that is, the micro-optic device does not display an imagery effect, and the other image channel produces a display image. In this embodiment, the micro-optic device is configured as an On-Off image switch. In one embodiment, the two interlaced images are greyscale images. In one embodiment, the interlaced images are dithered halftone binary images, so that the grey levels in the images can be simulated with a binary image consisting of image pixels. In one embodiment, the image pixels are of a fixed size, for example, 100 by 100 microns, and the frequency of the image pixels are modulated. In this embodiment, the image pixels comprise diffraction gratings.

In one embodiment, the image elements are associated with two interlaced images, and the micro-optic device produces a two-image flip of moire magnification effect. In this embodiment, the image elements are micron sized icons, numbers, or objects, which display the same information as the moire magnified optical effects generated by the micro-optic device. For example, if the micro-optic device projects moire magnified 5 and A to the viewer, then the image elements include micron-sized letters 5 and A integrally formed with the optical elements.

In another embodiment, the image elements are associated with two interlaced images and the micro-optic device produces an image flipping effect of the interlaced images. In one embodiment, each image element includes an array of dots. In one embodiment, the image elements that represent the first interlaced image are located on a left side of their corresponding optical elements, and the image elements that represent a second image are located on a right side of their corresponding optical elements.

In one embodiment, the optical elements include a one-dimensional array of part cylindrical lenses, and the image elements include phase displaced image elements, wherein the offset distance is a function of an input greyscale value derived from an input greyscale image.

In one embodiment, some of the optical elements may include a part concave and part convex surface profile.

In one embodiment, the image elements may be entirely formed in surfaces of the optical elements; or partially formed in surfaces of the optical elements, and partially located in spaces between adjacent optical elements; or some of the image elements may be formed in surfaces of the optical elements, and some may be located in spaces between adjacent optical elements.

In one embodiment, the image elements are recessed into the surfaces of the optical elements or the spaces between adjacent optical elements, and/or formed as protrusions which protrude from the surfaces of the optical elements or the spaces between adjacent optical elements. The image elements protruding, or recessed distance is less than the maximum depth or maximum height of the optical elements. Preferably the protruding or recessed distance is less than 7 microns, more preferably it is up to 5 microns, or less than 2 microns.

In one embodiment, the optical effect produced by the micro-optic device is observable from both surfaces of the substrate.

In one embodiment, the optical-effect observable from both surfaces of the substrate is due to the image elements being sampled by the optical elements.

In one embodiment, the optical effect observable from the first and the second surfaces of the substrate is an optically variable effect and different optically variable effects are observable from different surfaces of the substrate.

In some embodiments, random noise is applied to the interlaced images. For example, if the interlaced, moire, or integral imagery design is a monochromatic design, consisting of a black image on a white background, the black image is to be applied to the optical elements, then some of the image pixels are converted to white pixels, so as to reduce the surface area that the image elements need to occupy in the optical elements. In a preferred embodiment, less than 50% of the surface area of the optical elements is occupied by image elements.

In some embodiments, blank image frames are inserted into the images which are to be interlaced.

In some embodiments, some image frames are omitted from the interlaced images.

In one embodiment, the micro-optic device is formed by embossing an embossable material using a solid embossing roller, wherein the solid embossing roller includes microstructures directly formed in a surface of the embossing roller, the microstructures corresponding to the optical elements and the image elements of the micro-optic device.

In some embodiments, the optical elements have a period of up to 100 microns, more preferably from 25 to 65 microns. Preferably the sampling elements have a maximum depth, or maximum height of up to 12 microns, more preferably from 2 to 8 microns.

In a further aspect, the present disclosure provides a micro-optic device including:

- a substrate including a first surface and a second surface;
- optical elements, wherein some of the optical elements include a part concave and a part convex surface profile; and
- image elements, wherein the image elements are arranged to be sampled by the optical elements to produce an optical effect, and the optical elements and the image elements are integrally formed as a unitary structure located on the first or the second surface of the substrate.

In one embodiment, the image elements are associated with a plurality of interlaced images.

In one embodiment, the optical elements comprise a one-dimensional array of part cylindrical lenticular lenses. In another embodiment, the optical elements comprise a two-dimensional array of round or polygonal lenses.

In one embodiment, the image elements are associated with two interlaced images, and the micro-optic device produces a two-image flip of moire magnification effect. In this embodiment, the image elements are micron sized icons, numbers, or objects, which display the same information as the moire magnified optical effects generated by the micro-optic device. For example, if the micro-optic device projects moire magnified 5 and A to the viewer, then the image elements include micron-sized letters 5 and A integrally formed with the optical elements.

In one embodiment, the image elements may be entirely formed in surfaces of the optical elements; or partially formed in surfaces of the optical elements, and partially located in spaces between adjacent optical elements; or some of the image elements may be formed in surfaces of the optical elements, and some may be located in spaces between adjacent optical elements. In some embodiments, the image elements are formed such that they occupy not more than 50% of the surface area of the optical elements.

In one embodiment, the image elements are either recessed into the surfaces of the optical elements or the spaces between adjacent optical elements, and/or formed as protrusions which protrude from the surfaces of the optical elements or the spaces between adjacent optical elements. The image elements protruding, or recessed distance is less than the maximum depth or maximum height of the optical elements. Preferably the protruding or recessed distance is less than 7 microns, more preferably it is up to 5 microns, or less than 2 microns.

In one embodiment, the optical-effect produced by the micro-optic device is observable from both surfaces of the substrate.

In one embodiment, the optical-effect produced by the micro-optic device is due to the image elements being sampled by the optical effects.

In one embodiment, the optical effect observable from the first and the second surfaces of the substrate is an optically variable effect and different optically variable effects are observable from different surfaces of the substrate.

In one embodiment, the micro-optic device is formed by embossing an embossable material using a solid embossing roller, wherein the solid embossing roller includes microstructures directly formed in a surface of the embossing roller, the microstructures correspond to the optical elements and the image elements of the micro-optic device.

In one embodiment, the optical effect changes its visual appearance as the micro-optic device is viewed at different angles. In one embodiment, the depth of the optical effect changes as the device is viewed at different angles. In another embodiment, the form of the optical effect changes as the device is viewed at different angles. In yet another embodiment, both the depth and the form of the optical effect change as the device is viewed at different angles.

In some embodiments, the optical elements have a period of up to 100 microns, more preferably from 25 to 65 microns. Preferably the sampling elements have a maximum depth, or maximum height of up to 12 microns, more preferably from 2 to 8 microns.

In a further aspect, the present disclosure provides a micro-optic device including:

- a substrate including a first surface and a second surface;
- optical elements; and
- image elements, wherein the image elements are arranged to be sampled by the optical elements to produce an optical effect,
- wherein the optical elements and the image elements are integrally formed as a unitary structure located on the first or the second surface of the substrate, and at least some of the image elements are at least partially located in spaces between adjacent optical elements.

In one embodiment, some of the image elements are completely located in spaces between adjacent optical elements.

In one embodiment, the width of the optical elements is substantially smaller than the pitch of the optical elements.

In one embodiment, the width of the optical elements is not more than 75% of the pitch of the optical elements.

In some embodiments, the image elements are formed such that they occupy not more than 50% of the surface area of the optical elements.

In one embodiment, the optical elements comprise a one-dimensional lens array of part cylindrical lenticular lenses. In another embodiment, the optical elements comprise a two-dimensional array of round or polygonal lenses. In other embodiments, the optical elements may be 2D Fresnel lens array, or a DZP lens array.

In one embodiment, the optical elements comprise a two-dimensional lens array, wherein some of the lenses within the lens array include part concave and part convex surface profile.

In one embodiment, the image elements are either recessed into the surfaces of the optical elements or the spaces between adjacent optical elements, and/or formed as protrusions which protrude from the surfaces of the optical elements or the spaces between adjacent optical elements. The image elements protruding or recessed distance is less than the maximum depth or maximum height of the optical elements. Preferably the protruding or recessed distance is less than 7 microns, more preferably it is up to 5 microns, or less than 2 microns.

In one embodiment, the image elements are associated with a plurality of interlaced images.

In another embodiment, the image elements are associated with interlaced images which represent a 3-dimensional (3D) appearance of an object or a scene, such that the micro-optic device produces a 3D effect. In one embodiment, the image elements are formed as fixed size image pixels. The image pixels are of a fixed size, for example, approximately 10 microns. In one embodiment, the image pixels are of a square or a rectangular shape and are recessed into or protruding from the surface of the optical elements.

In another embodiment, the image elements are associated with two interlaced images and the micro-optic device produces an image flipping effect of the interlaced images. In one embodiment, each image element includes an array of dots. In one embodiment, the image elements that represent the first interlaced image are substantially located on a left side of their corresponding optical elements, and the image elements that represent a second image are substantially located on a right side of their corresponding optical elements.

In one embodiment, the optical elements include a one-dimensional array of part cylindrical lenses, and the image elements include phase displaced image elements, wherein the offset distance is a function of an input greyscale value derived from an input greyscale image.

In one embodiment, the optical-effect produced by the micro-optic device is observable from both surfaces of the substrate.

In one embodiment, the optical-effect produced by the micro-optic device is due to the image elements being sampled by the optical effects.

In one embodiment, the optical effect observable from the first and the second surfaces of the substrate is an optically variable effect and different optically variable effects are observable from different surfaces of the substrate.

In some embodiments, random noise is applied to the interlaced images. For example, if the interlaced, moire, or integral imagery design is a monochromatic design, consisting of a black image on a white background, the black image is to be applied to the optical elements, then some of the image pixels are converted to white pixels, so as to reduce the surface area that the image elements need to occupy in the optical elements. In a preferred embodiment, less than 50% of the surface area of the optical elements is occupied by image elements.

In some embodiments, blank image frames are inserted into the images which are to be interlaced.

In some embodiments, some image frames are omitted from the interlaced images.

In one embodiment, the micro-optic device is formed by embossing an embossable material using a solid embossing roller, wherein the solid embossing roller includes microstructures directly formed in a surface of the embossing roller, the microstructures correspond to the optical elements and the image elements of the micro-optic device.

In some embodiments, the optical elements have a period of up to 100 microns, more preferably from 25 to 65 microns. Preferably the sampling elements have a maximum depth, or maximum height of up to 12 microns, more preferably from 2 to 8 microns.

In one embodiment, the one-dimensional lens array of part cylindrical lenticular lenses is formed such that it has a lens width of 60 microns, lens pitch of 63.5 microns, lens sag of 10 microns.

In a further aspect, the present disclosure provides a micro-optic device including:

- a substrate including a first surface and a second surface;
- optical elements;
- image elements, integrally formed in a surface of the optical elements, wherein an angular rotation of an image element relative to its corresponding optical element is a function of an input greyscale value.

In one embodiment, the optical elements and the image elements are formed as a unitary structure located on the first or the second surface of the substrate.

In one embodiment, the input greyscale value is derived from an input greyscale image.

In one embodiment, the optical elements are concave lens elements, and the image elements are half disks occupying half of the surface area of each concave lens element.

In one embodiment, the micro-optic device produces a contrast switching effect upon tilting and or rotation of the device.

In one embodiment, the image elements are associated with a plurality of interlaced images.

In one embodiment, the image elements are associated with interlaced images which present an animation, such that micro-optic device displays an animation effect when the device is viewed at successive angles.

In another embodiment, the optical elements comprise a two dimensional array of round or polygonal lenses. In one embodiment, the optical elements include part concave and part convex lenses.

In one embodiment, the optical-effect produced by the micro-optic device is observable from both surfaces of the substrate.

In one embodiment, the optical-effect produced by the micro-optic device observable from both surfaces of the substrate are both due to the image elements being sampled by the optical effects.

In one embodiment, the optical effect observable from the first and the second surfaces of the substrate is an optically variable effect and different optically variable effects are observable from different surfaces of the substrate.

In one embodiment, the image elements may be entirely formed in surfaces of the optical elements; or partially formed in surfaces of the optical elements, and partially located in spaces between adjacent optical elements; or some of the image elements may be formed in surfaces of the optical elements, and some may be located in spaces between adjacent optical elements. In some embodiments, the image elements are formed such that they occupy not more than 50% of the surface area of the optical elements.

In some embodiments, random noise is applied to the interlaced images. For example, if the interlaced, moire, or integral imagery design is a monochromatic design, consisting of a black image on a white background, the black image is to be applied to the optical elements, then some of the image pixels are converted to white pixels, so as to reduce the surface area that the image elements need to occupy in the optical elements. In a preferred embodiment, less than 50% of the surface area of the optical elements is occupied by image elements.

In some embodiments, blank image frames are inserted into the images which are to be interlaced.

In some embodiments, some image frames are omitted from the interlaced images.

In one embodiment, the micro-optic device is formed by embossing an embossable material using a solid embossing roller, wherein the solid embossing roller includes microstructures directly formed in a surface of the embossing roller, the microstructures correspond to the optical elements and the image elements of the micro-optic device.

In some embodiments, the optical elements have a period of up to 100 microns, more preferably from 25 to 65 microns. Preferably the sampling elements have a maximum depth, or maximum height of up to 12 microns, more preferably from 2 to 8 microns.

In a further aspect, the present disclosure provides a method of forming a tool used for manufacturing a micro-optic device, the method including the following steps:

- coating an embossing roller with a layer of resist;
- exposing a first region of the embossing roller to a laser;
- removing the resist in the first region;
- etching the embossing roller in the first region;
- removing the remaining first layer of resist;
- coating the embossing roller with a second layer of resist;
- exposing a second region of the embossing roller to a second laser;
- removing the second layer of resist in the second region;
- etching the embossing roller in the second region;
- removing the remaining second layer of resist.

In one embodiment, the first region corresponds to image elements of the micro-optic device, and the second region corresponds to optical elements of the micro-optic devices.

In one embodiment, the first and second layer of resists are removed by a developer solution.

In one embodiment, the etching of the embossing roller is achieved by immersing the embossing roller in a chemical etchant.

In one embodiment, the embossing roller is etched by a shallower depth in the first etching step, and is etched by a greater depth in the second etching step.

In one embodiment, the second layer of resist is applied such that it substantially covers the embossing roller including the first region which has already been etched by the chemical etchant.

In one embodiment, the embossing roller is etched to a depth of up to 5 microns after the first etching step, and the embossing roller is etched to a depth of up to 10 microns after the second etching step.

In one embodiment, the second etching step is arranged to etch into the first region such that a total depth of up to 15 microns is etched in some regions.

In one embodiment, the embossing roller is chrome plated to improve its durability.

In one embodiment, the first and the second region at least partially overlap.

In one embodiment, the tool is used to emboss a unitary structure of the micro-optic device including both the optical elements and the image elements in a single embossing step.

In a further aspect, the present disclosure provides a method of manufacturing the micro-optic device of the first, second, third, fourth, fifth aspects of the present disclosure, by embossing a layer of embossable material in a single embossing step.

In one embodiment, the embossing of the embossable material is carried out by the tool of the sixth aspect.

In one embodiment, the embossable material is a curable resin, and preferably a UV curable resin.

In one embodiment, the substrate is a polymer substrate.

In one embodiment, the substrate is a clear BOPP banknote substrate.

In another embodiment, the substrate is opaque.

In one embodiment, a reflective layer is provided to enhance visibility of the optical effect(s). The reflective layer may be provided between the substrate and the micro-optic device, or alternatively, it may be provided between the micro-optic device and an observer, for example as a thin translucent coating over the optical elements and the image elements.

In one embodiment, a protective overcoat is provided to prevent copying of the micro-optic device.

In one embodiment, the optical effect produced by the micro-optic device is double sided optically variable effect. In one embodiment, the optical effect displays different visual appearances when the micro-optic device is viewed from different sides of the substrate.

In some embodiments, noise may be added to the interlaced images so as to reduce the area that the image elements need to occupy on the surface area of the optical elements. Alternatively, blank image frames may be inserted, and/or image frames may be omitted.

In one or more embodiments, the optical elements and the image elements are integrated into a unitary structure.

In one or more embodiments, the plurality of image elements are recessed with respect to the optical elements.

In one or more embodiments, the plurality of image elements are raised with respect to the optical elements.

What is claimed is:

1. A micro-optic device, comprising:

a substrate including a first surface and a second surface;

optical elements; and image elements, wherein the optical elements and the image elements are integrally formed as a unitary structure located on the first or the second surface of the substrate, and a reflective layer, provided between at least one of (i) the substrate and the unitary structure or (ii) the unitary structure and an observer as a translucent coating over the optical elements and the image elements;

wherein the image elements are arranged to be sampled by the optical elements with the reflective layer to form a focusing structure configured to produce a first optical effect observable from the first surface of the substrate, and the same image elements are arranged to be sampled by the optical elements with the reflective layer to form the focusing structure configured to produce a second optical effect observable from the second surface of the substrate.

2. The micro-optic device of claim 1, wherein the first and second optical effects are observable in both transmission and reflection from each surface of the substrate.

3. The micro-optic device of claim 1, wherein both the first optical effect and the second optical effect are optically variable effects.

4. The micro-optic device of claim 1, wherein the first optical effect and the second optical effect are different optical variable effects.

5. The micro-optic device of claim 1, wherein both the first and the second optical effects are moire magnification effects or integral image effects.

6. The micro-optic device of claim 5, wherein a perceived depth effect of the moire magnification effects or integral image effects is inverted when the micro-optic device is viewed from opposite side of the substrate.

7. The micro-optic device of claim 5, wherein a perceived depth effect of the moire magnification effects is inverted when the micro-optic device is viewed in reflection, but not in transmission.

8. The micro-optic device of claim 1, wherein the image elements are associated with a plurality of interlaced images, or moire images, or integral images.

9. The micro-optic device of claim 8, wherein the image elements are associated with interlaced images which represent an animation, such that micro-optic device displays an animation effect when the device is viewed at successive angles.

10. The micro-optic device of claim 9, wherein the image elements are associated with interlaced images which represent a 3-dimensional (3D) appearance of an object or a scene, such that the micro-optic device produces a 3D effect.

11. The micro-optic device of claim 1, wherein the image elements are formed as fixed size image pixels, wherein the image pixels are of a square or a rectangular shape of approximately 10 microns and are recessed into or protruding from the surface of the optical elements.

12. The micro-optic device of claim 11, wherein the image elements are associated with two interlaced images and the micro-optic device produces an image flipping effect of the interlaced images.

13. The micro-optic device of claim 12, wherein each image element includes an array of dots, and the image elements that represent the first interlaced image are substantially located on a left side of their corresponding optical elements, and the image elements that represent a second image are substantially located on a right side of their corresponding optical elements.

14. The micro-optic device of claim 1, wherein the optical elements include a one-dimensional array of part cylindrical lenses, and the image elements are offset with respect to a lens axis, wherein an offset distance is a function of an input greyscale value derived from an input greyscale image.

15. The micro-optic device of claim 1, wherein the optical elements include part concave and part convex lenses.

16. The micro-optic device of claim 1, wherein the image elements are entirely formed in surfaces of the optical elements; or partially formed in surfaces of the optical elements, and partially located in spaces between adjacent optical elements; or some of the image elements may be formed in surfaces of the optical elements, and some may be located in spaces between adjacent optical elements.

17. The micro-optic device according of claim 16, wherein the image elements are formed such that they occupy not more than 50% of the surface area of the optical elements.

18. The micro-optic device of claim 1, wherein the image elements are either recessed into surfaces of the optical elements or spaces between adjacent optical elements, or formed as protrusions which protrude from the surfaces of the optical elements or the spaces between adjacent optical elements, wherein the image elements protruding or recessed distance is less than the maximum depth or maximum height of the optical elements.

19. The micro-optic device of claim 18, wherein the protruding or recessed distance is less than 7 microns.

20. The micro-optic device of claim 1, wherein the reflective layer is provided to enhance visibility of the optical effect(s).

* * * * *